US012666478B1

(12) United States Patent　　(10) Patent No.:　US 12,666,478 B1
Kuo　　(45) Date of Patent:　Jun. 23, 2026

(54) METHOD AND APPARATUS FOR REMOVING SRAP HEADER IN A WIRELESS COMMUNICATION SYSTEM

(71) Applicant: ASUS Technology Licensing Inc., Taipei City (TW)

(72) Inventor: Richard Lee-Chee Kuo, Taipei City (TW)

(73) Assignee: ASUS Technology Licensing Inc., Taipei City (TW)

( * ) Notice: Subject to any disclaimer, the term of this patent is extended or adjusted under 35 U.S.C. 154(b) by 0 days.

(21) Appl. No.: 19/408,762

(22) Filed: Dec. 4, 2025

Related U.S. Application Data

(60) Provisional application No. 63/880,123, filed on Sep. 11, 2025.

(51) Int. Cl.
*H04B 7/14*　　(2006.01)
*H04W 76/14*　　(2018.01)
*H04W 88/04*　　(2009.01)

(52) U.S. Cl.
CPC ............ *H04W 76/14* (2018.02); *H04W 88/04* (2013.01)

(58) Field of Classification Search
CPC .............................. H04W 76/14; H04W 88/04
See application file for complete search history.

(56) References Cited

U.S. PATENT DOCUMENTS

2025/0374283 A1* 12/2025 Pan ........................ H04W 72/21
2026/0032747 A1* 1/2026 Yue ........................ H04W 76/15

FOREIGN PATENT DOCUMENTS

EP　　　4451777　　10/2024

OTHER PUBLICATIONS

Oppo, "Running CR of TS 38.351 for NR sidelink relay enhancements", R2-231xxxx, 3GPP TSG-RAN2 Meeting #123b Xiamen, China, Oct. 9-13.
Oppo, "Remaining SRAP open issues in R19 L2 Multi-hop U2N sidelink Relay", R2-250xxxx, 3GPP TSG-RAN WG2 #130, xxx, xxx, May 2025.
Apple, Ericsson, "[Draft] Report of [POST129][402][Relay] Control plane approach 2 impact (Apple/Ericsson)", R2-25xxxx, 3GPP TSG-RAN WG2 Meeting #129bis, Wuhan, China, Apr. 7-11, 2025.

* cited by examiner

*Primary Examiner* — Shantell L Heiber
(74) *Attorney, Agent, or Firm* — Blue Capital Law Firm, P.C.

(57)　　　　　ABSTRACT

A method and device for a UE-to-Network (U2N) Relay User Equipment (UE) are disclosed. In one embodiment, the U2N Relay UE establishes at least one PC5 connection (or PC5 unicast link) with at least one child UE and establishes a Radio Resource Control (RRC) connection with a network node. Furthermore, the U2N Relay UE receives a Sidelink Relay Adaptation Protocol (SRAP) Data Protocol Data Unit (PDU) on a Uu Relay Radio Link Control (RLC) Channel from the network node, wherein the SRAP Data PDU includes a header and a data field and wherein the header includes a BEARER identity (ID) field and a UE ID field.

20 Claims, 16 Drawing Sheets

Oct 1

...

| Bit | Description |
|-----|-------------|
| 0 | SRAP Data PDU |
| 1 | SRAP Control PDU (not used in this release) |

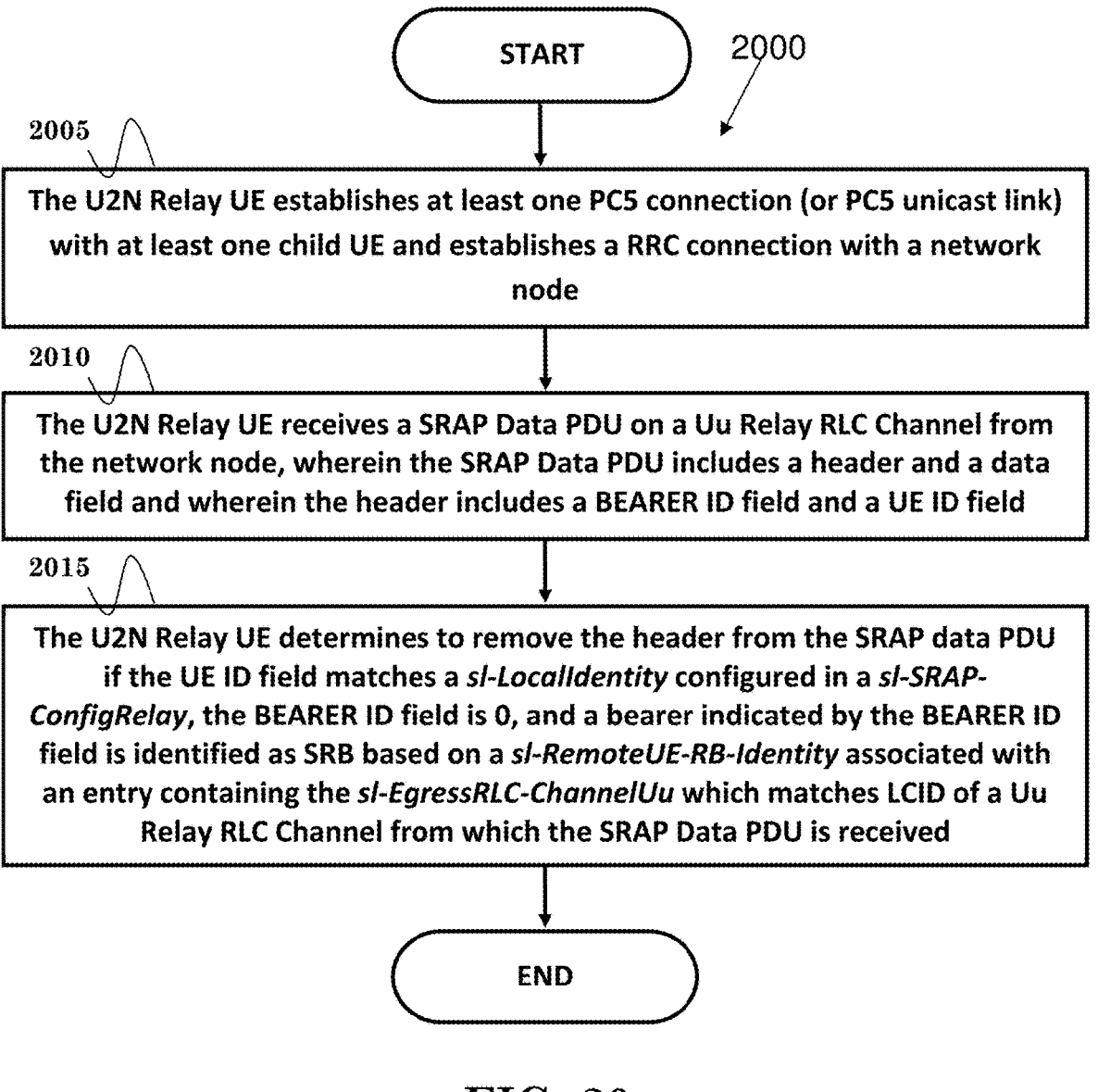

START

2000

2005

The U2N Relay UE establishes at least one PC5 connection (or PC5 unicast link) with at least one child UE and establishes a RRC connection with a network node

2010

The U2N Relay UE receives a SRAP Data PDU on a Uu Relay RLC Channel from the network node, wherein the SRAP Data PDU includes a header and a data field and wherein the header includes a BEARER ID field and a UE ID field

2015

The U2N Relay UE determines to remove the header from the SRAP data PDU if the UE ID field matches a *sl-LocalIdentity* configured in a *sl-SRAP-ConfigRelay*, the BEARER ID field is 0, and a bearer indicated by the BEARER ID field is identified as SRB based on a *sl-RemoteUE-RB-Identity* associated with an entry containing the *sl-EgressRLC-ChannelUu* which matches LCID of a Uu Relay RLC Channel from which the SRAP Data PDU is received

END

FIG. 20

METHOD AND APPARATUS FOR REMOVING SRAP HEADER IN A WIRELESS COMMUNICATION SYSTEM

CROSS-REFERENCE TO RELATED APPLICATIONS

The present Application claims the benefit of U.S. Provisional Patent Application Ser. No. 63/880,123 filed on Sep. 11, 2025, the entire disclosure of which is incorporated herein in its entirety by reference.

FIELD

This disclosure generally relates to wireless communication networks, and more particularly, to a method and apparatus for removing Sidelink Relay Adaptation Protocol (SRAP) header in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device for a UE-to-Network (U2N) Relay User Equipment (UE) are disclosed. In one embodiment, the U2N Relay UE establishes at least one PC5 connection (or PC5 unicast link) with at least one child UE and establishes a Radio Resource Control (RRC) connection with a network node. Furthermore, the U2N Relay UE receives a Sidelink Relay Adaptation Protocol (SRAP) Data Protocol Data Unit (PDU) on a Uu Relay Radio Link Control (RLC) Channel from the network node, wherein the SRAP Data PDU includes a header and a data field and wherein the header includes a BEARER identity (ID) field and a UE ID field. In addition, the U2N Relay UE determines to remove the header from the SRAP data PDU if the UE ID field matches a sl-LocalIdentity configured in a sl-SRAP-ConfigRelay, the BEARER ID field is 0, and a bearer indicated by the BEARER ID field is identified as Signalling Radio Bearer (SRB) based on a sl-RemoteUE-RB-Identity associated with an entry containing the sl-EgressRLC-ChannelUu which matches a Logical Channel ID (LCID) of a Uu Relay RLC Channel from which the SRAP Data PDU is received.

BRIEF DESCRIPTION OF THE DRAWINGS

FIG. 20 is a flow chart according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: 3GPP R2-2506568, "Introduction of NR sidelink multi-hop U2N Relay (in TS 38.300)"; 3GPP R2-2506574, "Introduction of NR sidelink multi-hop relay (in TS 38.331)"; 3GPP R2-2506566, "Introduction of NR sidelink multi-hop relay in TS 38.351"; and 3GPP TS 38.331 V18.6.0, "NR; Radio Resource Control (RRC) protocol specification (Release 18)". The standards and documents listed above are hereby expressly incorporated by reference in their entirety.

Figure 1:
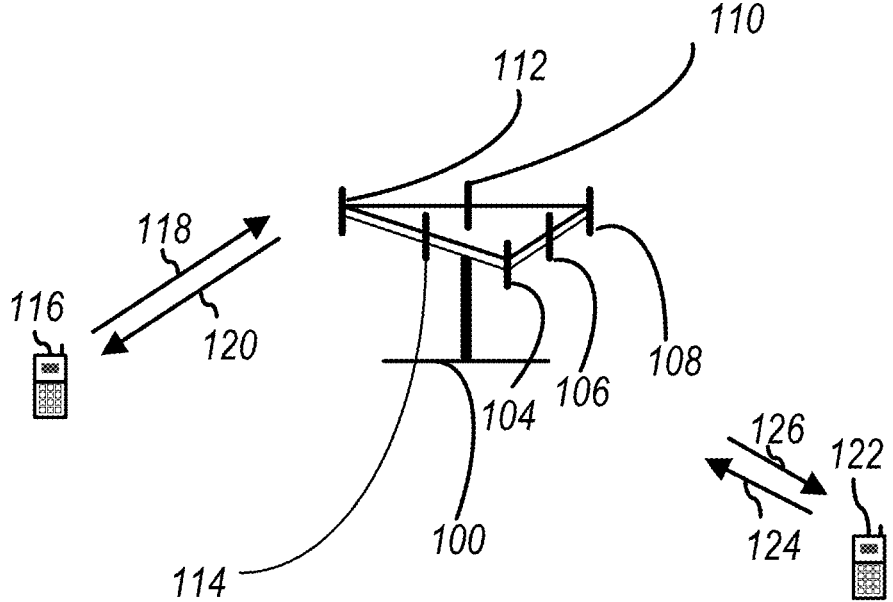
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
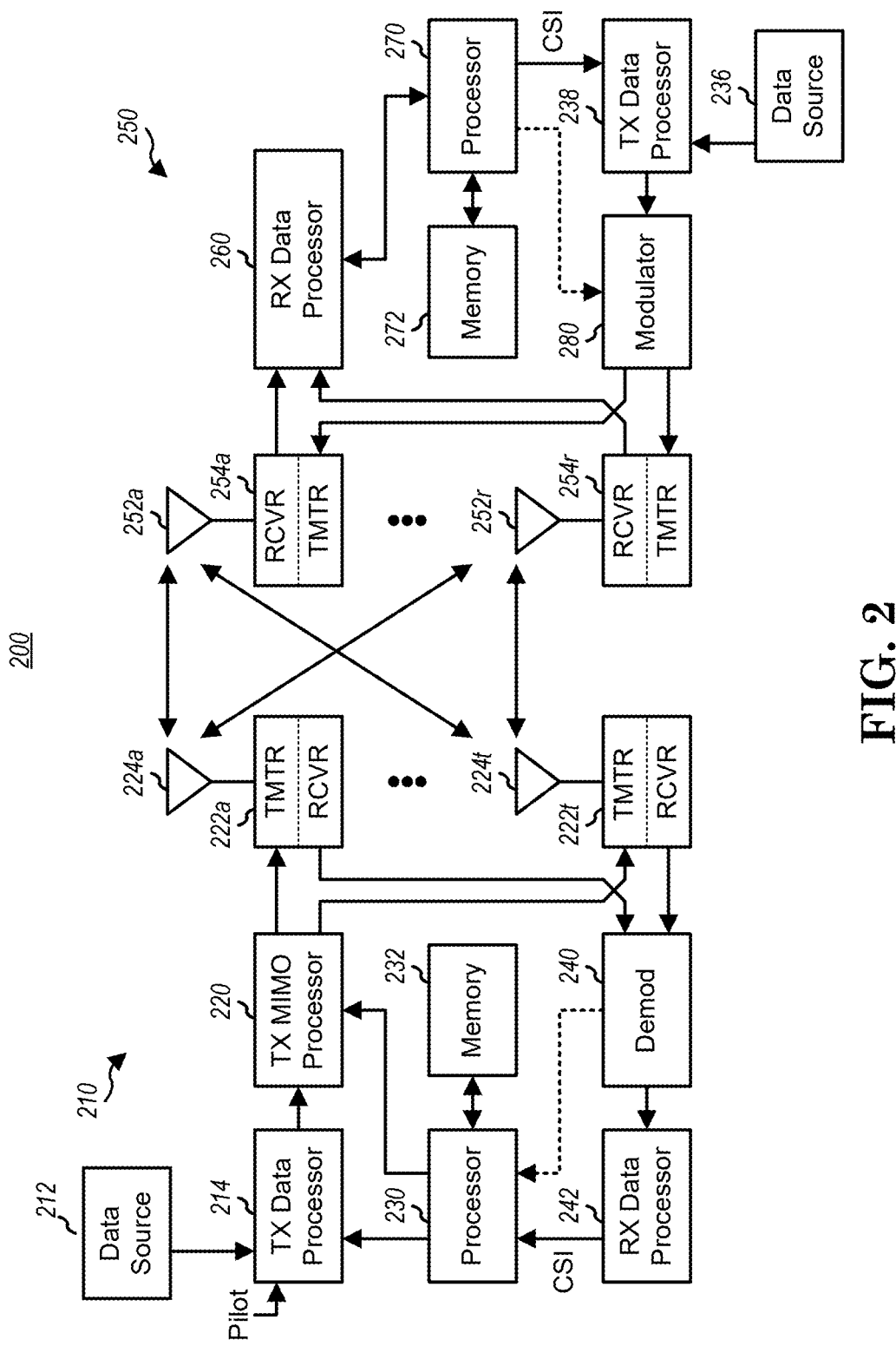
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
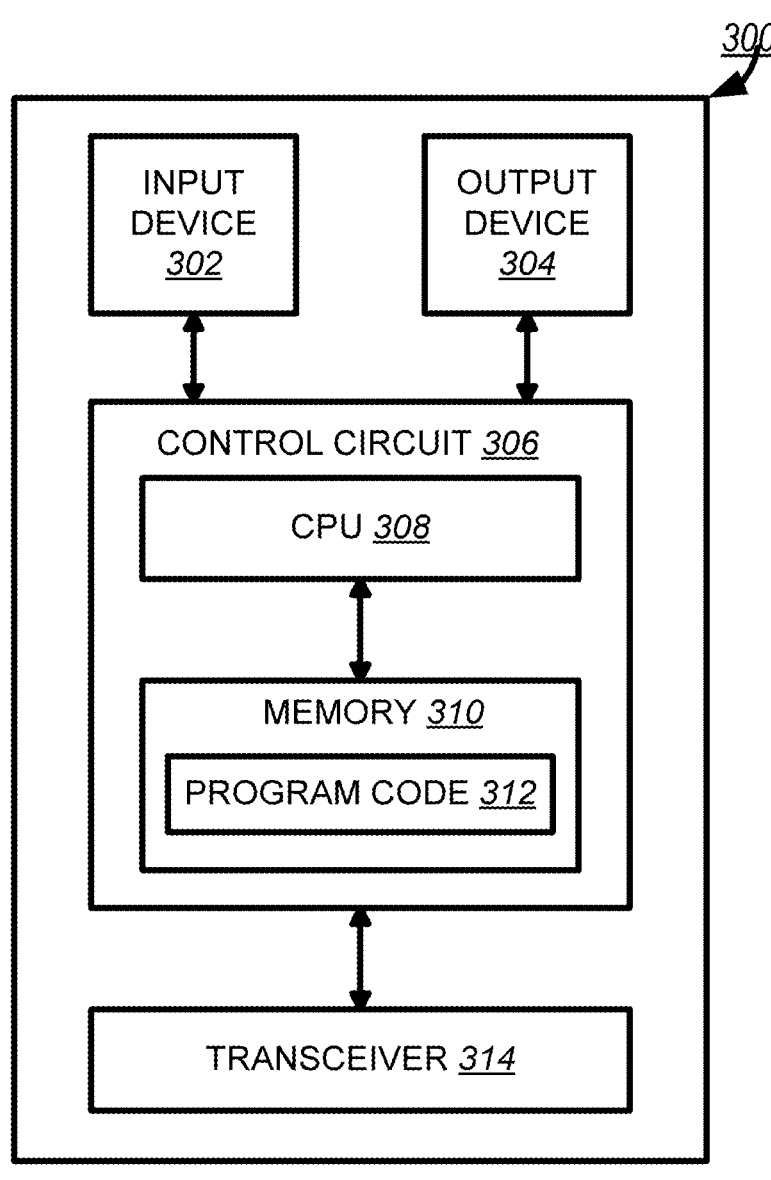
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
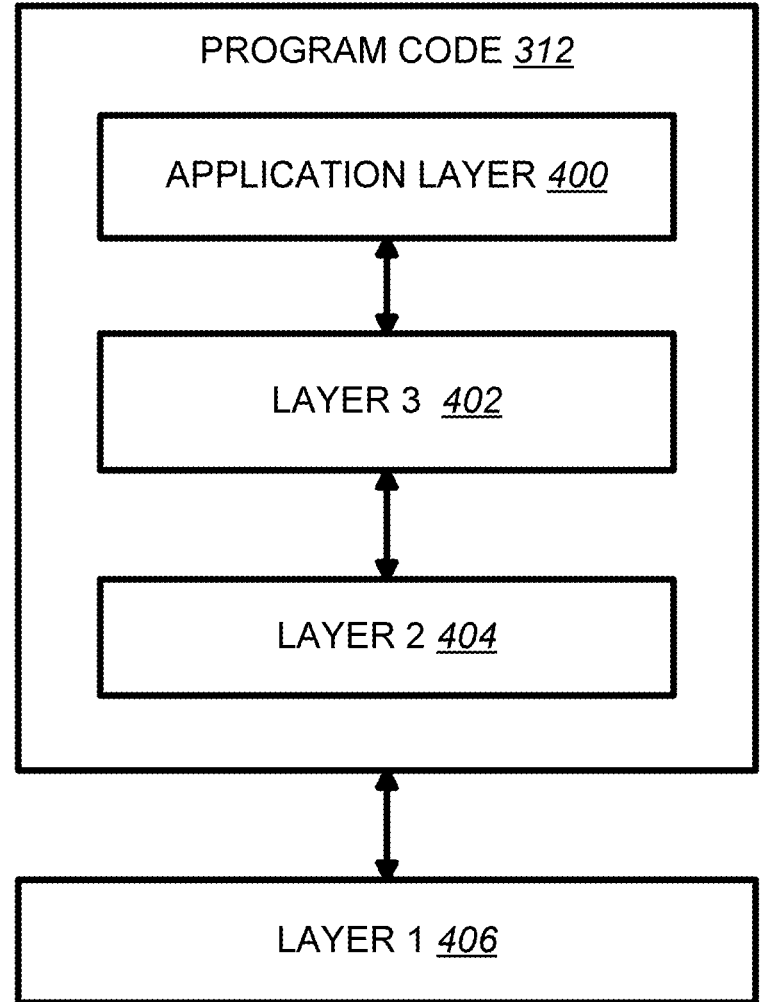
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP R2-2506568 is a running change request (CR) for introduction of $N_R$ sidelink multi-hop U2N Relay in 3GPP TS 38.300. Procedures related to UE-to-Network Relay as follows:

16.12 Sidelink Relay 16.12.1 General

Sidelink relay supports 5G ProSe UE-to-Network Relay (U2N Relay) function (specified in TS 23.304 [48]) to provide single/multi-hop connectivity to the network for U2N Remote UE(s). Both L2 and L3 U2N Relay architectures are supported. The L3 U2N Relay architecture is transparent to the serving NG-RAN of the U2N Relay UE, except for controlling sidelink resources. The detailed architecture and procedures for L3 U2N Relay can be found in TS 23.304 [48].

A U2N Relay UE shall be in RRC_CONNECTED to perform relaying of unicast data.

For L2 U2N Relay operation, the following RRC state combinations are supported:

Both L2 U2N Relay UE and L2 U2N Remote UE shall be in RRC_CONNECTED to perform transmission/reception of relayed unicast data; and The L2 U2N Relay UE can be in RRC_IDLE, RRC_INACTIVE or RRC_CONNECTED as long as all the L2 U2N Remote UE(s) that are connected to the L2 U2N Relay UE are either in RRC_INACTIVE or in RRC_IDLE.

A single unicast link is established between one L2 U2N Relay UE and one L2 U2N Remote UE and, in case of multi-hop L2 U2N relay, between L2 U2N Relay UEs. The traffic to the NG-RAN of L2 U2N Remote UE via a given L2 U2N Relay UE and the traffic of the L2 U2N Relay UE shall be separated in different Uu RLC channels.

In multi-hop U2N Relay, U2N Remote UE refers to both the actual U2N Remote UE and the intermediate U2N Relay UE that also functions as a U2N Remote UE. The intermediate U2N Relay UE can have its own traffic acting as a U2N Remote UE simultaneously.

For L2 U2N Relay, the L2 U2N Remote UE can only be configured to use resource allocation mode 2 (as specified in 5.7.2 and 16.9.3.1) for data to be relayed.

[ . . . ]

16.12.2 Protocol Architecture 16.12.2.1 L2 UE-to-Network Relay

Figures 15, 16:
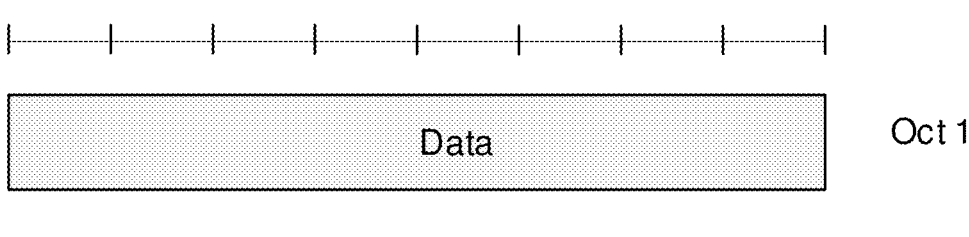

The protocol stacks for the user plane and control plane of single-hop L2 U2N Relay architecture are illustrated in FIG. 16.12.2.1-1 and FIG. 16.12.2.1-2. The protocol stacks for the user plane and control plane of multi-hop L2 U2N Relay architecture are illustrated in FIG. 16.12.2.1-3 and FIG. 16.12.2.1-4. The SRAP sublayer is placed above the RLC sublayer for both CP and UP at both PC5 interface and Uu interface. The Uu SDAP, PDCP and RRC are terminated between L2 U2N Remote UE and gNB, while SRAP, RLC, MAC and PHY are terminated in each hop (i.e., the link between L2 U2N Remote UE and the L2 U2N Relay UE, the link between L2 U2N Relay UEs, and the link between L2 U2N Relay UE and the gNB).

For L2 U2N Relay, the SRAP sublayer over PC5 hop is only for the purpose of bearer mapping. The SRAP sublayer is not present over PC5 hop for relaying the L2 U2N Remote UE's message on BCCH and PCCH. For L2 U2N Remote UE's message on SRB0, the SRAP header is not present over PC5 hop between the U2N Remote UE and the directly connected U2N Relay UE, but the SRAP header is present over Uu hop or PC5 hop between U2N Relay UEs for both DL and UL.

[ . . . ]

Figure 5:
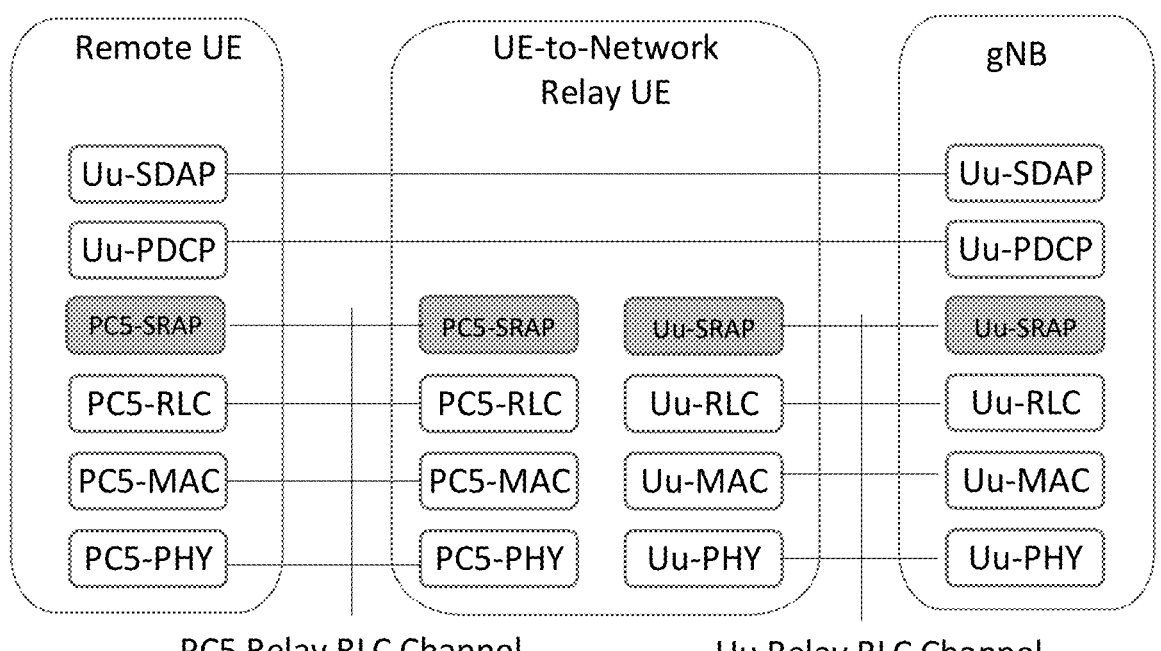
FIG. 5 is a reproduction of FIG. 16.12.2.1-1 of 3GPP R2-2506568.

[FIG. 16.12.2.1-2 of 3GPP R2-2506568, entitled "Control plane protocol stack for single-hop L2 UE-to-Network Relay", is reproduced as FIG. 5]

[ . . . ]

Figure 6:
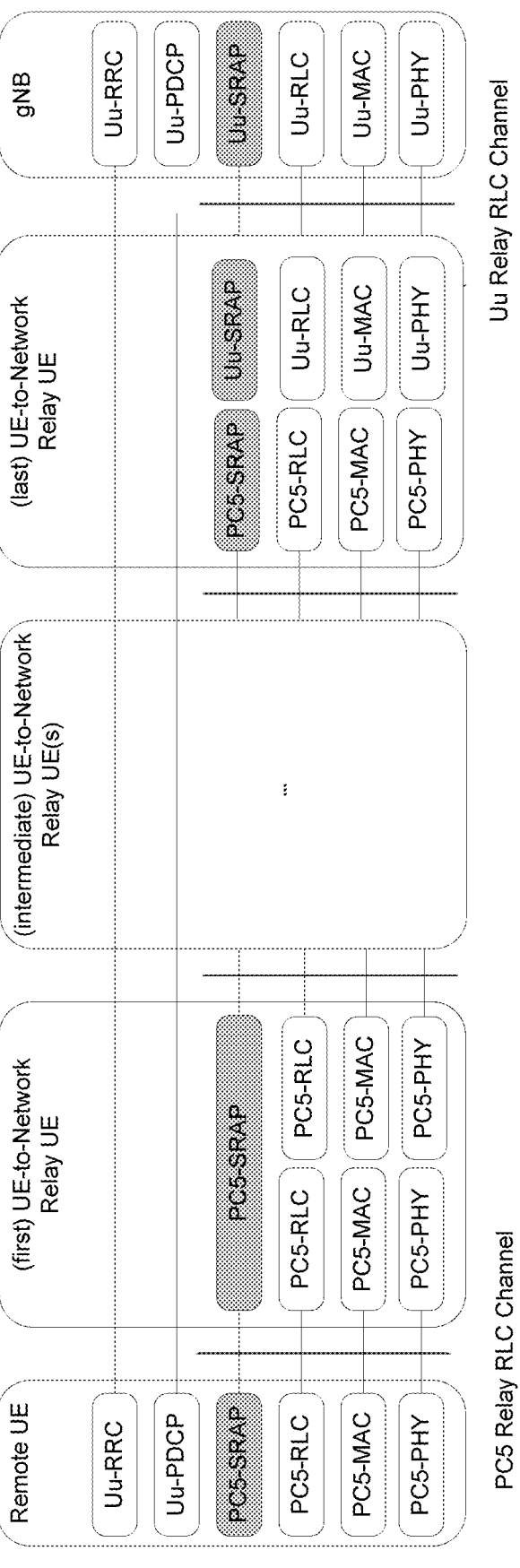
FIG. 6 is a reproduction of FIG. 16.12.2.1-4 of 3GPP R2-2506568.

[FIG. 16.12.2.1-4 of 3GPP R2-2506568, entitled "Control plane protocol stack for multi-hop L2 UE-to-Network Relay", is reproduced as FIG. 6]

For L2 U2N Relay, for uplink:

The Uu/PC5 SRAP sublayer at the U2N Relay UE performs UL bearer mapping between end-to-end Uu Radio Bearers of L2 U2N remote UE (identified for the purposes of this mapping by the local Remote UE ID and an associated bearer ID) and egress Uu/PC5 Relay RLC channels over the L2 U2N Relay UE Uu/PC5 interface. For uplink relaying traffic, the different end-to-end Uu Radio Bearers (SRBs or DRBs) of the same L2 U2N Remote UE and/or different L2 U2N Remote UEs can be multiplexed over the same egress Uu/PC5 Relay RLC channel;

The Uu/PC5 SRAP sublayer at the U2N Relay UE supports L2 U2N Remote UE identification for the UL traffic. The identity information of L2 U2N Remote UE end-to-end Uu Radio Bearer and a local Remote UE ID are included in the Uu SRAP header at UL in order for gNB to correlate the received packets for the specific PDCP entity associated with the right end-to-end Uu Radio Bearer of the L2 U2N Remote UE;

The PC5 SRAP sublayer at the L2 U2N Remote UE supports UL bearer mapping between L2 U2N Remote UE end-to-end Uu Radio Bearers and egress PC5 Relay RLC channels.

For L2 U2N Relay, for downlink:

The Uu SRAP sublayer performs DL bearer mapping at gNB to map end-to-end Uu Radio Bearer (SRB, DRB) of L2 U2N Remote UE (identified for the purposes of this mapping by the local Remote UE ID and an associated bearer ID) into Uu Relay RLC channel. The Uu/PC5 SRAP sublayer at the U2N Relay UE performs DL bearer mapping and data multiplexing between multiple end-to-end Radio Bearers (SRBs or DRBs) of a L2 U2N Remote UE and/or different L2 U2N Remote UEs and one Uu Relay RLC channel over the L2 U2N Relay UE Uu/PC5 interface;

The Uu/PC5 SRAP sublayer at the U2N Relay UE supports L2 U2N Remote UE identification for DL traffic. The identity information of L2 U2N Remote UE end-to-end Uu Radio Bearer and a local Remote UE ID are included into the Uu SRAP header by the gNB at DL for the L2 U2N Relay UE to identify the corresponding end-to-end Uu Radio Bearer(s) of L2 U2N Remote UE;

The PC5 SRAP sublayer at the L2 U2N Relay UE performs DL bearer mapping between end-to-end Uu Radio Bearers of L2 U2N remote UE and egress PC5 Relay RLC channels;

The PC5 SRAP sublayer at the L2 U2N Remote UE correlates the received packets with the right PDCP entity associated with the given end-to-end Uu Radio Bearer of the L2 U2N Remote UE based on the identity information included in the PC5 SRAP header.

A local Remote UE ID is included in both PC5 SRAP header and Uu SRAP header. L2 U2N Relay UE is configured by the gNB with the local Remote UE ID(s) to be used in SRAP header. L2 U2N Remote UE obtains the local Remote ID from the gNB via Uu RRC messages including RRCSetup, RRCReconfiguration, RRCResume and RRCReestablishment.

The end-to-end DRB(s) or end-to-end SRB(s), except SRB0, of L2 U2N Remote UE can be multiplexed to the PC5 Relay RLC channels and Uu Relay RLC channels in both PC5 hop and Uu hop, but an end-to-end DRB and an end-to-end SRB can neither be mapped into the same PC5 Relay RLC channel nor be mapped into the same Uu Relay RLC channel.

It is the gNB responsibility to avoid collision on the usage of local Remote UE ID. The gNB can update the local Remote UE ID by sending the updated local Remote UE ID via RRCReconfiguration message. The serving gNB can perform local Remote UE ID update independent of the PC5 unicast link L2 ID update procedure.

[ . . . ]

16.12.5 Control Plane Procedures for L2 U2N Relay 16.12.5.1 RRC Connection Management The L2 U2N Remote UE needs to establish its own PDU sessions/DRBs with the network before user plane data transmission.

The NR sidelink PC5 unicast link establishment procedures can be used to setup a secure unicast link between L2 U2N Remote UE and L2 U2N Relay UE before L2 U2N Remote UE establishes a Uu RRC connection with the network via L2 U2N Relay UE.

The establishment of Uu SRB1/SRB2 and DRB of the L2 U2N Remote UE is subject to Uu configuration procedures for L2 UE-to-Network Relay.

Figure 7:
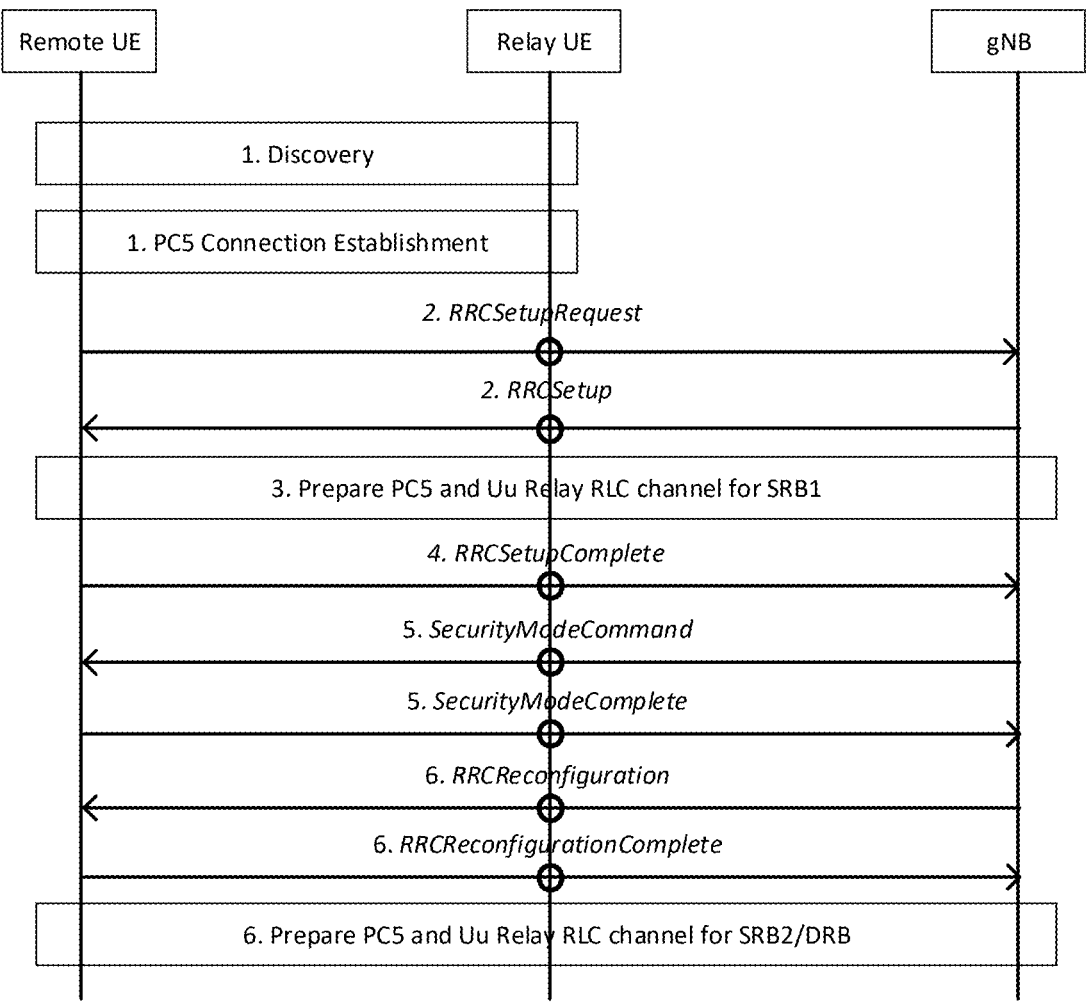
FIG. 7 is a reproduction of FIG. 16.12.5.1-1 of 3GPP R2-2506568.

The following high level connection establishment procedure in FIG. 16.12.5.1-1 applies to a L2 U2N Relay and L2 U2N Remote UE:

[FIG. 16.12.5.1-1 of 3GPP R2-2506568, entitled "Procedure for L2 U2N Remote UE connection establishment", is reproduced as FIG. 7]

1. The L2 U2N Remote and L2 U2N Relay UE perform discovery procedure, and establish a PC5-RRC connection using the NR sidelink PC5 unicast link establishment procedure.

2. The L2 U2N Remote UE sends the first RRC message (i.e., RRCSetupRequest) for its connection establishment with gNB via the L2 U2N Relay UE, using a specified PC5 Relay RLC channel configuration. The L2 U2N Relay UE sends the SidelinkUEInformationNR message to request for the dedicated configurations required to support the relay operation for the L2 U2N Remote UE. If the L2 U2N Relay UE is not in RRC_CONNECTED, it needs to do its own Uu RRC connection establishment upon reception of a message on the specified PC5 Relay RLC channel. After L2 U2N Relay UE's RRC connection establishment procedure and sending the SidelinkUEInformationNR message, gNB configures SRB0 relaying Uu Relay RLC channel to the U2N Relay UE. The gNB responds with an RRCSetup message to L2 U2N Remote UE. The RRCSetup message is sent to the L2 U2N Remote UE using SRB0 relaying Uu Relay RLC channel over Uu and a specified PC5 Relay RLC channel over PC5.

NOTE 1: Void.

3. The gNB and L2 U2N Relay UE perform relaying channel setup procedure over Uu. According to the configuration from gNB, the L2 U2N Relay/Remote UE establishes a PC5 Relay RLC channel for relaying of SRB1 towards the L2 U2N Remote/Relay UE over PC5.

4. The RRCSetupComplete message is sent by the L2 U2N Remote UE to the gNB via the L2 U2N Relay UE using SRB1 relaying channel over PC5 and SRB1 relaying channel configured to the L2 U2N Relay UE over Uu. Then the L2 U2N Remote UE is as in RRC_CONNECTED with the gNB.

5. The L2 U2N Remote UE and gNB establish security following the Uu security mode procedure and the security messages are forwarded through the L2 U2N Relay UE.

6. The gNB sends an RRCReconfiguration message to the L2 U2N Remote UE via the L2 U2N Relay UE, to setup the end-to-end SRB2/DRBs of the L2 U2N Remote UE. The L2 U2N Remote UE sends an RRCReconfigurationComplete message to the gNB via the L2 U2N Relay UE as a response. In addition, the gNB may configure additional Uu Relay RLC channels between the gNB and L2 U2N Relay UE, and PC5 Relay RLC channels between L2 U2N Relay UE and L2 U2N Remote UE for the relaying traffic.

Figure 8:
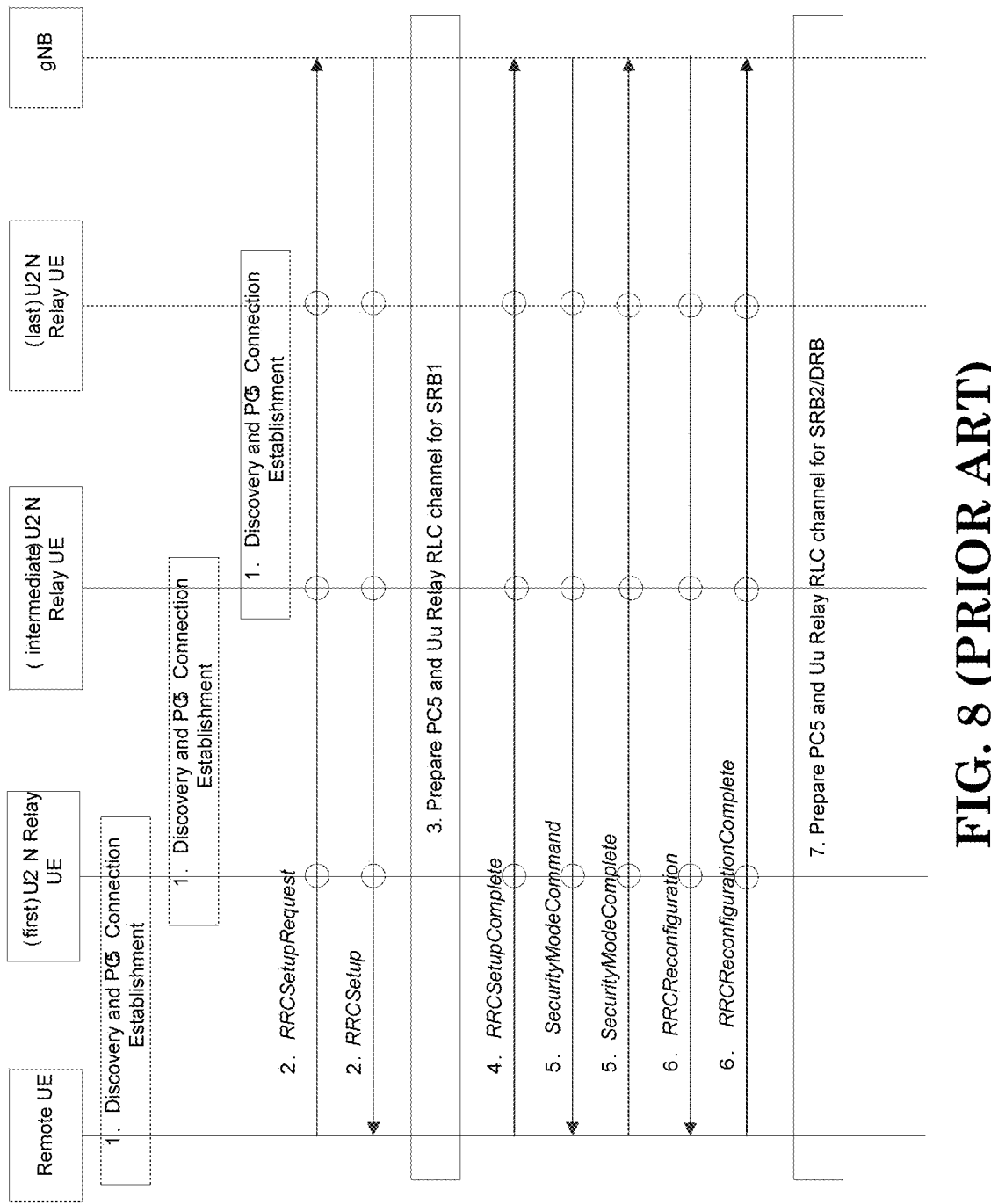
FIG. 8 is a reproduction of FIG. 16.12.5.1-2 of 3GPP R2-2506568.

The following high level connection establishment procedure in FIG. 16.12.5.1-2 applies to a multi-hop L2 U2N Relay(s) and L2 U2N Remote UE:

[FIG. 16.12.5.1-2 of 3GPP R2-2506568, entitled "Procedure for multi-hop L2 U2N Remote UE connection establishment", is reproduced as FIG. 8]

1. The L2 U2N Remote and the first L2 U2N Relay UE, and between L2 U2N Relay UEs, perform a discovery procedure and establish a PC5-RRC connection using the NR sidelink PC5 unicast link establishment procedure.

2. The L2 U2N Remote UE sends the first RRC message (i.e., RRCSetupRequest) for its connection establishment with gNB via the first L2 U2N Relay UE, using a specified PC5 Relay RLC channel configuration. The first L2 U2N Relay UE sends the SidelinkUEInformationNR message to request for the dedicated configurations required to support the relay operation for the L2 U2N Remote UE. If the first L2 U2N Relay UE is not in RRC_CONNECTED, it performs its connection establishment procedure with the gNB. In this case, the first L2 U2N Relay UE acts as a L2 U2N Remote UE to establish its own relay connection. The first L2 U2N Relay UE stores the first RRC message received from the L2 U2N Remote UE and sends its own first RRC message (i.e., RRCSetupRequest) via the parent UE, using a specified PC5 Relay RLC channel configuration. If the parent UE is not the last L2 U2N Relay UE and not in RRC_CONNECTED, the same connection establishment procedure as the first L2 U2N Relay UE is performed. If the parent UE is the last L2 U2N Relay UE and not in RRC_CONNECTED, the same connection establishment procedure as the L2 U2N Relay UE in the single-hop is performed. After the first L2 U2N Relay UE's RRC connection establishment procedure and sending the SidelinkUEInformationNR message, gNB configures SRB0 relaying PC5 Relay RLC channel to the first L2 U2N Relay UE. The first L2 U2N Relay UE sends the stored first RRC message of the L2 U2N Remote UE to the gNB via the parent UE. The gNB responds with an RRCSetup message to L2 U2N Remote UE. The RRCSetup message is delivered toward the L2 U2N Remote UE using SRB0 relaying Uu Relay RLC channel over Uu or PC5 Relay RLC channel over PC5 through multiple U2N Relay UEs. The RRCSetup message for the L2 U2N Remote UE is delivered via a specified PC5 Relay RLC channel over PC5 from the first L2 U2N Relay UE to the L2 U2N Remote UE.

3. The gNB and the last L2 U2N Relay UE perform relaying channel setup procedure over Uu. The gNB and the intermediate L2 U2N Relay UE(s) perform relaying channel setup procedure over PC5. According to the configuration from gNB, the L2 U2N Relay UEs/Remote UE establishes a PC5 Relay RLC channel for relaying of SRB1 towards the L2 U2N Remote UE/Relay UEs over PC5.

4. The RRCSetupComplete message is sent by the L2 U2N Remote UE to the gNB via intermediate L2 U2N Relay UE(s) using SRB1 relaying channel over PC5 and SRB1 relaying channel configured to the last L2 U2N Relay UE over Uu. Then the L2 U2N Remote UE is as in RRC_CONNECTED with the gNB.

5. The L2 U2N Remote UE and gNB establish security following the Uu security mode procedure and the security messages are forwarded through the multiple L2 U2N Relay UEs.

6. The gNB sends an RRCReconfiguration message to the L2 U2N Remote UE via multiple L2 U2N Relay UEs, to setup the end-to-end SRB2/DRBs of the L2 U2N Remote UE. The L2 U2N Remote UE sends an RRCReconfigurationComplete message to the gNB via multiple L2 U2N Relay UEs as a response. In addition, the gNB may configure additional Uu Relay RLC channels between the gNB and the last L2 U2N Relay UE, and PC5 Relay RLC channels between L2 U2N Relay UEs, and between the first L2 U2N Relay UE and L2 U2N Remote UE for the relaying traffic.

3GPP R2-2506574 is a running change request (CR) for introduction of $N_R$ sidelink multi-hop relay in 3GPP TS 38.331. Procedures related to UE-to-Network Relay are as follows:

5.3.5 RRC Reconfiguration 5.3.5.1 General

Figure 9:
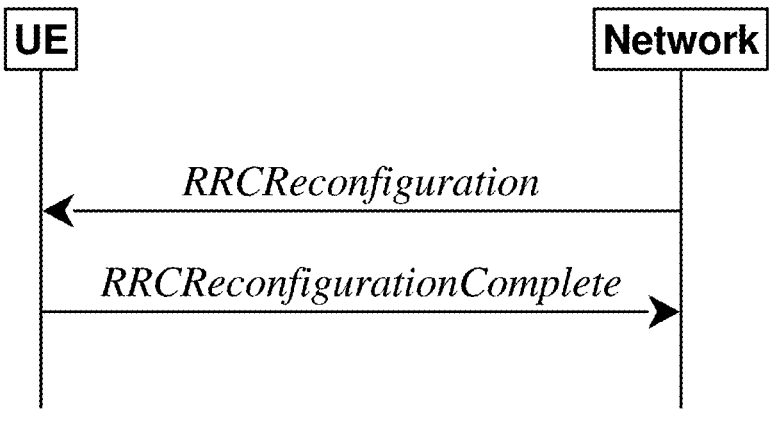
FIG. 9 is a reproduction of FIG. 5.3.5.1-1 of 3GPP R2-2506574.

[FIG. 5.3.5.1-1 of 3GPP R2-2506574, entitled "RRC reconfiguration, successful", is reproduced as FIG. 9]

[ . . . ]

The purpose of this procedure is to modify an RRC connection, e.g. to establish/modify/release RBs/BH RLC channels/Uu Relay RLC channels/PC5 Relay RLC channels, to perform reconfiguration with sync, to setup/modify/release measurements, to add/modify/release SCells and cell groups, to add/modify/release conditional reconfiguration configuration, to add/modify/release LTM configuration, and to add/modify/release MP configuration. As part of the procedure, NAS dedicated information may be transferred from the Network to the UE.

[ . . . ]

10

5.3.5.2 Initiation

The Network may initiate the RRC reconfiguration procedure to a UE in RRC_CONNECTED. The Network applies the procedure as follows:

[ . . . ]

the establishment of RBs (other than SRB1, that is established during RRC connection establishment) is performed only when AS security has been activated;

the establishment of BH RLC Channels for IAB is performed only when AS security has been activated;

the configuration of NCR-Fwd is performed only when AS security has been activated;

the establishment of Uu Relay RLC channels and PC5 Relay RLC channels (other than SL-RLC0 and SL-RLC1) for L2 U2N Relay UE in case of single hop or for L2 Last U2N Relay UE is performed only when AS security has been activated, and the establishment of PC5 Relay RLC channels for L2 U2N Remote UE or for L2 Intermediate U2N Relay UE (other than SL-RLC0 and SL-RLC1) is performed only when AS security has been activated;

[ . . . ]

5.8.3 Sidelink UE Information for NR Sidelink Communication/Discovery/Positioning 5.8.3.1 General

Figure 10:
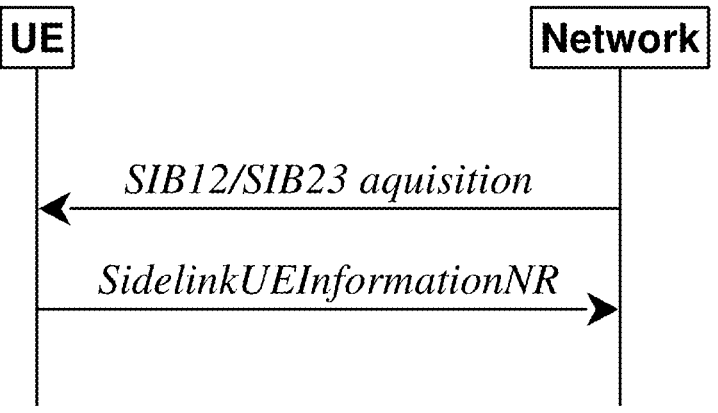
FIG. 10 is a reproduction of FIG. 5.8.3.1-1 of 3GPP R2-2506574.

[FIG. 5.8.3.1-1 of 3GPP R2-2506574, entitled "Sidelink UE information for NR sidelink communication/discovery/positioning", is reproduced as FIG. 10]

The purpose of this procedure is to inform the network that the UE:

is interested or no longer interested to receive or transmit NR sidelink communication/discovery/positioning, is requesting assignment or release of transmission resource for NR sidelink communication/discovery/positioning,

[ . . . ]

is reporting parameters related to single hop or multi hop U2N relay operation, is reporting parameters related to U2U relay operation.

[ . . . ]

5.8.3.3 Actions Related to Transmission of SidelinkUEInformationNR Message

The UE shall set the contents of the SidelinkUEInformationNR message as follows:

[ . . . ]

3> if SIB12 includes sl-L2U2N-Relay and if configured by upper layers to transmit $N_R$ sidelink L2 U2N relay communication and the UE is acting as L2 U2N Relay UE:

4> include sl-TxResourceReqL2U2N-Relay in sl-TxResourceReqListCommRelay and set its fields (if needed) as follows for each destination for which it requests network to assign NR sidelink L2 U2N relay communication resource:

5> set sl-DestinationIdentityL2U2N to the destination identity configured by upper layer for NR sidelink L2 U2N relay communication transmission;

5> set sl-TxInterestedFreqListL2U2N to indicate the frequency of the associated destination for NR sidelink L2 U2N relay communication transmission;

5> set sl-TypeTxSyncListL2U2N to the current synchronization reference type used on the associated sl-TxInterestedFreqListL2U2N for NR sidelink L2 U2N relay communication transmission;

5> set sl-LocalID-Request to request local ID for L2 U2N Remote UE transiting to RRC_CON-NECTED or in RRC_CONNECTED state;

5> set sl-PagingIdentityRemoteUE to the paging UE ID received from peer L2 U2N Remote UE, if it is not released as in 5.8.9.8.3;

5> set sl-CapabilityInformationSidelink to include UECapabilityInformationSidelink message, if any, received from peer UE;

4> include ue-Type and set it to relayUE;

[ . . . ]

5.8.9 Sidelink RRC Procedure 5.8.9.1 Sidelink RRC Reconfiguration 5.8.9.1.1 General

Figure 11:
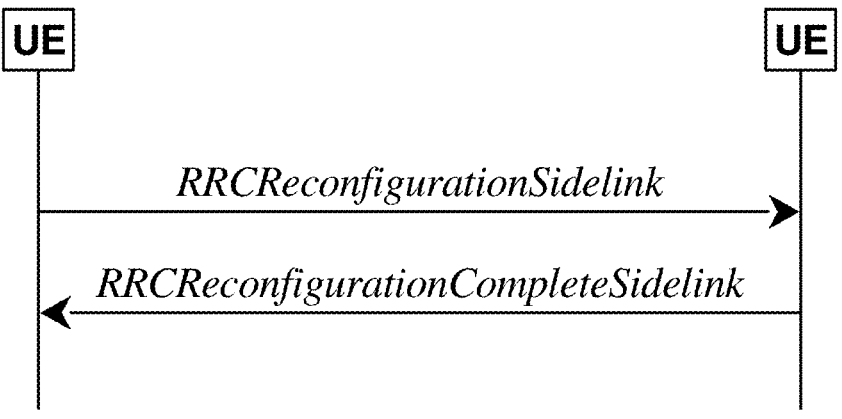
FIG. 11 is a reproduction of FIG. 5.8.9.1.1-1 of 3GPP R2-2506574.

[FIG. 5.8.9.1.1-1 of 3GPP R2-2506574, entitled "Sidelink RRC reconfiguration, successful", is reproduced as FIG. 11]

Figure 12:
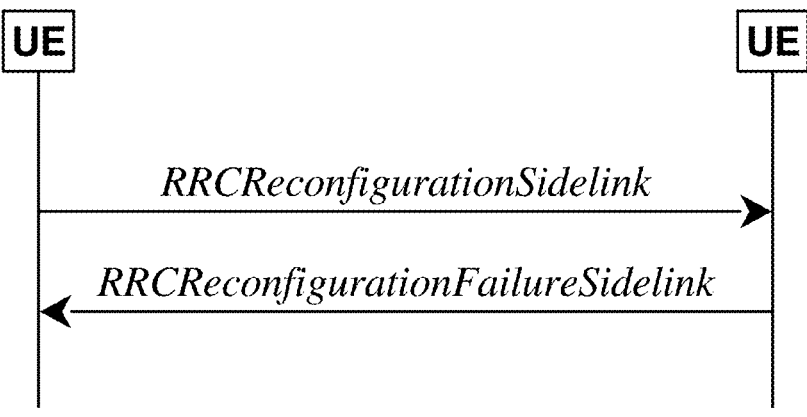
FIG. 12 is a reproduction of FIG. 5.8.9.1.1-2 of 3GPP R2-2506574.

[FIG. 5.8.9.1.1-2 of 3GPP R2-2506574, entitled "Sidelink RRC reconfiguration, failure", is reproduced as FIG. 12]

The purpose of this procedure is to modify a PC5-RRC connection, e.g. to establish/modify/release sidelink DRBs or additional sidelink RLC bearer or PC5 Relay RLC channels, to add/release sidelink carrier, to (re-)configure NR sidelink measurement and reporting, to (re-)configure sidelink CSI reference signal resources, to (re)configure CSI reporting latency bound, to (re)configure sidelink DRX, to (re-)configure the latency bound of SL Inter-UE coordination report, and to indicate the SFN-DFN offset in case of single hop. The UE may initiate the sidelink RRC reconfiguration procedure and perform the operation in clause 5.8.9.1.2 on the corresponding PC5-RRC connection in following cases:

the release of sidelink DRBs associated with the peer UE, or peer L2 U2U Remote UE in case of L2 U2U Relay operation, as specified in clause 5.8.9.1a.1;

the establishment of sidelink DRBs associated with the peer UE, or peer L2 U2U Remote UE in case of L2 U2U Relay operation, as specified in clause 5.8.9.1a.2;

the modification for the parameters included in SLRB-Config of sidelink DRBs associated with the peer UE, or peer L2 U2U Remote UE in case of L2 U2U Relay operation, as specified in clause 5.8.9.1a.2;

the release of additional sidelink RLC bearer associated with the peer UE, as specified in clause 5.8.9.1a.5;

the establishment of additional sidelink RLC bearer associated with the peer UE, as specified in clause 5.8.9.1a.6;

the modification for the parameters included in SL-RLC-BearerConfig of additional sidelink RLC bearer associated with the peer UE, as specified in clause 5.8.9.1a.6;

the release of PC5 Relay RLC channels for L2 U2N/U2U Relay UE and Remote UE, as specified in clause 5.8.9.7.1;

the establishment of PC5 Relay RLC channels for L2 U2N/U2U Relay UE and Remote UE, as specified in clause 5.8.9.7.2;

the modification for the parameters included in SL-RLC-ChannelConfigPC5 of PC5 Relay RLC channels for L2 U2N/U2U Relay UE and Remote UE, as specified in clause 5.8.9.7.2;

the release of sidelink carrier associated with the peer UE, as specified in clause 5.8.9.1b.1;

the addition of sidelink carrier associated with the peer UE, as specified in clause 5.8.9.1b.2;

the (re-)configuration of the peer UE to perform NR sidelink measurement and report.

the (re-)configuration of the sidelink CSI reference signal resources and CSI reporting latency bound;

the (re-)configuration of the peer UE to perform sidelink DRX;

the (re-)configuration of the latency bound of SL Inter-UE coordination report;

the (re-)configuration of the local UE ID pair for L2 U2U Remote UE and its peer L2 U2U Remote UE by L2 U2U Relay UE.

the response to the request in a RemoteUEInformation-Sidelink message for the SFN-DFN offset from the L2 U2N Remote UE in case of single hop;

the change in the value of the SFN-DFN offset at the L2 U2N Relay UE.

NOTE: It is up to L2 U2N Relay UE implementation to determine when the SFN-DFN offset has changed in value to a degree requiring an update to be sent to the L2 U2N Remote UE.

In RRC_CONNECTED, the UE applies the NR sidelink communications parameters provided in RRCReconfiguration (if any). In RRC_IDLE or RRC_INACTIVE, the UE applies the NR sidelink communications parameters provided in system information (if any). For other cases, UEs apply the NR sidelink communications parameters provided in SidelinkPreconfigNR (if any). When UE performs state transition between above three cases, the UE applies the NR sidelink communications parameters provided in the new state, after acquisition of the new configurations. Before acquisition of the new configurations, UE continues applying the NR sidelink communications parameters provided in the old state.

[ . . . ]

RRCReconfiguration

The RRCReconfiguration message is the command to modify an RRC connection. It may convey information for measurement configuration, mobility control, radio resource configuration (including RBs, MAC main configuration and physical channel configuration) and AS security configuration.

RRCReconfiguration message

```
-- ASN1START
-- TAG-RRCRECONFIGURATION-START

...

RRCReconfiguration-v1700-IEs ::=            SEQUENCE {
    otherConfig-v1700                           OtherConfig-v1700
OPTIONAL, -- Need M
    sl-L2RelayUE-Config-r17                     SetupRelease { SL-L2RelayUE-Config-r17 }
OPTIONAL, -- Need M
    sl-L2RemoteUE-Config-r17                    SetupRelease { SL-L2RemoteUE-Config-r17 }
OPTIONAL, -- Need M
    dedicatedPagingDelivery-r17                 OCTET STRING (CONTAINING Paging)
```

-continued

| RRCReconfiguration message | |
|---|---|
| OPTIONAL, -- Cond PagingRelay | |
|     needForGapNCSG-ConfigNR-r17 | SetupRelease { NeedForGapNCSG-ConfigNR-r17} |
| OPTIONAL, -- Need M | |
|     needForGapNCSG-ConfigEUTRA-r17 | SetupRelease { NeedForGapNCSG-ConfigEUTRA-r17} |
| OPTIONAL, -- Need M | |
|     musim-GapConfig-r17 | SetupRelease {MUSIM-GapConfig-r17} |
| OPTIONAL, -- Need M | |
|     ul-GapFR2-Config-r17 | SetupRelease { UL-GapFR2-Config-r17 } |
| OPTIONAL, -- Need M | |
|     scg-State-r17 | ENUMERATED { deactivated } |
| OPTIONAL, -- Need N | |
|     appLayerMeasConfig-r17 | AppLayerMeasConfig-r17 |
| OPTIONAL, -- Need M | |
|     ue-TxTEG-RequestUL-TDOA-Config-r17 | SetupRelease {UE-TxTEG-RequestUL-TDOA-Config-r17} |
| OPTIONAL, -- Need M | |
|     nonCriticalExtension | RRCReconfiguration-v1800-IEs |
| OPTIONAL | |
| } | |

[ . . . ]
RRCSetup
    The RRCSetup message is used to establish SRB1.
[ . . . ]

| RRCSetup message |
|---|

```
-- ASN1START

-- TAG-RRCSETUP-START

RRCSetup ::=                SEQUENCE {
    rrc-TransactionIdentifier      RRC-TransactionIdentifier,
    criticalExtensions             CHOICE {
        rrcSetup                       RRCSetup-IEs,
        criticalExtensions Future      SEQUENCE { }
    }
}
RRCSetup-IEs ::=            SEQUENCE {
    radioBearerConfig              RadioBearerConfig,
    masterCellGroup                OCTET STRING (CONTAINING CellGroupConfig),
    lateNonCriticalExtension       OCTET STRING
OPTIONAL,
    nonCriticalExtension           RRCSetup-v1700-IEs
OPTIONAL
}
RRCSetup-v1700-IEs ::=     SEQUENCE {
    sl-ConfigDedicatedNR-r17       SL-ConfigDedicatedNR-r16
OPTIONAL, -- Cood L2remoteUE
    sl-L2RemoteUE-Config-r17       SL-L2RemoteUE-Config-r17
OPTIONAL, -- Cond E2RemoteUE
    nonCriticalExtension           SEQUENCE { }
OPTIONAL
}
-- TAG-RRCSETUP-STOP

-- ASN1STOP
```

| RRCSetup-IEs field descriptions |
| --- |
| masterCellGroup |
| The network configures only the RLC bearer for the SRB1, mac-CellGroupConfig, physicalCellGroupConfig and spCellConfig. |
| radioBearerConfig |
| Only SRB1 can be configured in RRC setup. |
| sl-ConfigDedicatedNR |
| Contains dedicated configurations for NR sidelink communication. The network configures only the PC5 Relay RLC channel and sl-PHY-MAC-RLC-Config used for the SRB1. |
| sl-L2RemoteUE-Config |
| Contains dedicated configurations used for L2 U2N relay related operation. The network configures only the SRAP configuration used for the SRB1 and local UE ID. |

[ . . . ]

SL-L2RelayUE-Config

The IE SL-L2RelayUE-Config is used to configure L2 U2N relay operation related configurations used by L2 U2N Relay UE, or L2 U2U relay operation related configurations used by L2 U2U Relay UE.

| SL-L2RelayUE-Config field descriptions |
| --- |
| sl-RemoteUE-ToAddModList |
| List of L2 U2N Remote UEs to be added and modified to the L2 U2N Relay UE. |
| sl-RemoteUE-ToReleaseList |
| List of L2 U2N Remote UEs to be released by the L2 U2N Relay UE. |
| sl-U2U-RemoteUE-ToAddModList |
| List of target L2 U2U Remote UEs for which the related configuration is to be added and modified to the L2 U2U Relay UE. |
| sl-U2U-RemoteUE-ToReleaseList |
| List of target L2 U2U Remote UEs for which the related configuration is to be released by the L2 U2U Relay UE. |

| SL-L2RelayUE-Config information element |
| --- |

```
-- ASN1START
-- TAG-SL-L2RELAYUE-CONFIG-START
SL-L2RelayUE-Config-r17 ::=              SEQUENCE {
    sl-RemoteUE-ToAddModList-r17            SEQUENCE (SIZE (1..maxNrofRemoteUE-r17)) OF SL-RemoteUE-
ToAddMod-r17      OPTIONAL,     -- Need N
    sl-RemoteUE-ToReleaseList-r17              SEQUENCE (SIZE (1..maxNrofRemoteUE-r17)) OF SL-
DestinationIdentity-r16   OPTIONAL,          -- Need N
    ...,
    [[
    sl-U2U-RemoteUE-ToAddModList-r18   SEQUENCE (SIZE (1..maxNrofSL-Dest-r16) ) OF SL-U2U-
RemoteUE-Config-r18   OPTIONAL,       --Need N
    sl-U2U-RemoteUE-ToReleaseList-r18      SEQUENCE (SIZE (1..maxNrofSL-Dest-r16) ) OF SL-
DestinationIdentity-r16   OPTIONAL        -- Need N
    ]]
}
SL-RemoteUE-ToAddMod-r17 ::=         SEQUENCE {
    sl-L2IdentityRemote-r17                SL-DestinationIdentity-r16,
    sl-SRAP-ConfigRelay-r17                SL-SRAP-Config-r17
OPTIONAL,    -- Need M
    ...,
    [[
    sl-SRAP-ConfigRelay-ToAddModList-r19       SEQUENCE (SIZE (1..maxNrofRemoteUE-r17)) OF SL-SRAP-
Config-ToAddMod-r19       OPTIONAL,      -- Need R
    sl-SRAP-ConfigRelay-ToReleaseList-r19       SEQUENCE (SIZE (1..maxNrofRemoteUE-r17)) OF SL-SRAP-
ConfigId-r19                OPTIONAL      -- Need R
    ]]
}
SL-U2U-RemoteUE-Config-r18 ::=       SEQUENCE {
    sl-L2IdentityRemoteUE-r18               SL-DestinationIdentity-r16,
    sl-SourceRemoteUE-ToAddModList-r18   SEQUENCE (SIZE (1..maxNrofSL-Dest-r16) ) OF SL-
SourceRemoteUE-Config-r18      OPTIONAL,   -- Need N
    sl-SourceRemoteUE-ToReleaseList-r18 SEQUENCE (SIZE (1..maxNrofSL-Dest-r16)) OF SL-
SourceIdentity-r17              OPTIONAL,    -- Need R
    ...
}
SL-SourceRemoteUE-Config-r18 ::=   SEQUENCE {
    sl-SourceUE-Identity-r18               SL-SourceIdentity-r17,
    sl-SRAP-ConfigU2U-r18                 SL-SRAP-ConfigU2U-r18,
    ...
}
SL-SRAP-Config-ToAddMod-r19 ::=     SEQUENCE {
    sl-SRAP-ConfigId-r19                 SL-SRAP-ConfigId-r19,
    sl-SRAP-ConfigRelay-r17                SL-SRAP-Config-r17
    ...
}
-- TAG-ST-LARELAYUR-CONFIG-STOP
-- ASN1STOP
```

SL-L2RelayUE-Config field descriptions sl-U2U-SourceRemoteUE-ToAddModList

List of Source L2 U2U Remote UEs for which the related
configuration is to be added and modified relative
to the destination L2 U2U Remote UE identified by the sl-
L2IdentityRemoteUE.

sl-U2U-SourceRemoteUE-ToReleaseList

List of Source L2 U2U Remote UEs for which the related
configuration is to be releasedr elative to the destination
L2 U2U Remote UE identified by the sl-L2IdentityRemoteUE.

sl-SRAP-ConfigRelay-ToAddModList

List of SRAP configuration for each indirectly connected
child UE in the multi hop case sl-SRAP-ConfigRelay-ToReleaseList List of SRAP configuration be released for each
indirectly connected child UE in the multi hop case SL-L2RemoteUE-Config field descriptions sl-SRAP-ConfigRemote Indicates SRAP configuration used for L2 U2N Remote UE.
sl-UEIdentityRemote Indicates the C-RNTI to the L2 U2N Remote UE.
sl-U2U-RelayUE-ToAddModList List of L2 U2U Relay UEs for which the related configuration
is to be added and modified to the L2 U2U Remote UE.
sl-U2U-RelayUE-ToReleaseList List of L2 U2U Relay UEs for which the related
configuration is to be released by the L2 U2U Remote UE.
sl-U2U-TargetRemoteUE-ToAddModList List of target L2 U2U Remote UEs for which the related
configuration is to be added and modified relative
to the L2 U2U Relay UE identified by the sl-L2IdentityRelay.
sl-U2U-TargetRemoteUE-ToReleaseList List of target L2 U2U Remote UEs for which the related configuration
is to be released relative to the L2 U2U
Relay UE identified by the sl-L2IdentityRelay.

[ . . . ]

SL-L2RemoteUE-Config

The IE SL-L2RemoteUE-Config is used to configure L2
U2N relay operation related configurations used by L2 U2N
Remote UE, or L2 U2U relay operation related configurations used by L2 U2U Remote UE.

[ . . . ]

SL-SRAP-Config

The IE SL-SRAP-Config is used to set the configurable
SRAP parameters used by L2 U2N Relay UE and L2 U2N
Remote UE as specified in TS 38.351 [66].

SL-L2RemoteUE-Config information element

```
-- ASN1START
-- TAG-SL-L2REMOTEUE-CONFIG-START
SL-L2RemoteUE-Config-r17 ::=            SEQUENCE {
    sl-SRAP-ConfigRemote-r17               SL-SRAP-Config-r17
OPTIONAL,   --Need M
    sl-UEIdentityRemote-r17                RNTI-Value
OPTIONAL, -- Cond FirstPROReconfig
    ...,
    [[
    sl-U2U-RelayUE-ToAddModList-r18        SEQUENCE (SIZE (1..maxNrofSL-Dest-r16)) OF SL-U2U-Rel-
ayUE-
Config-r18      OPTIONAL,      -- Need N
    sl-U2U-RelayUE-ToReleaseList-r18       SEQUENCE (SIZE (1..maxNrofSL-Dest-r16) OF SL-
DestinationIdentity-r16          OPTIONAL          -- Need N
    ]]
}
SL-U2U-RelayUE-Config-r18 ::=            SEQUENCE {
    sl-L2IdentityRelay-r18                   SL-DestinationIdentity-r16,
    sl-TargetRemoteUE-ToAddModList-r18       SEQUENCE (SIZE (1..maxNrofSL-Dest-r16)) OF SL-
TargetRemoteUE-Config-r18   OPTIONAL,   -- Need N
    sl-TargetRemoteUE-ToReleaseList-r18 SEQUENCE (SIZE (1..maxNrofSL-Dest-r16)) OF SL-
DestinationIdentity-r16        OPTIONAL,      -- Need N
    ...
}
SL-TargetRemoteUE-Config-r18 ::=     SEQUENCE {
    sl-TargetUE-Identity-r18                SL-DestinationIdentity-r16,
    sl-SRAP-ConfigU2U-r18                   SL-SRAP-ConfigU2U-r18,
    ...
}
-- TAG-SL-L2REMOTEUE-CONFIG-STOP
-- ASN1STOP
```

---

SL-SRAP-Config information element

---

```
-- ASN1START
-- TAG-SL-SRAP-CONFIG-START
SL-SRAP-Config-r17 ::=              SEQUENCE {
    sl-LocalIdentity-r17               INTEGER (0..255)
OPTIONAL, -- Need M
    sl-MappingToAddModList-r17         SEQUENCE (SIZE (1..maxLC-ID)) OF SL-MappingToAddMod-
r17          OPTIONAL, -- Need N
    sl-MappingToReleaseList-r17        SEQUENCE (SIZE (1..maxLC-ID)) OF SL-RemoteUE-RB-
Identity-r17        OPTIONAL, -- Need N
    ...
}
SL-MappingToAddMod-r17 ::=          SEQUENCE {
    sl-RemoteUE-RB-Identity-r17        SL-RemoteUE-RB-Identity-r17,
    sl-EgressRLC-ChannelUu-r17         Uu-RelayRLC-ChannelID-r17
OPTIONAL, -- Cond L2RelayUE
    sl-EgressRLC-ChannelPC5-r17        SL-RLC-ChannelID-r17
OPTIONAL, -- Need N
    ...,
    [[
    sl-EgressRLC-Channel-UL-r19             SL-RLC-ChannelID-r17
OPTIONAL, -- Need N
    sl-EgressRLC-Channel-DL-r19             SL-RLC-ChannelID-r17
OPTIONAL -- Need N
    ]]
}
SL-RemoteUE-RB-Identity-r17 ::=     CHOICE {
    srb-Identity-r17                   INTEGER (0..3),
    drb-Identity-r17                   DRB-Identity,
    ...
}
-- TAG-SL-SRAP-CONFIG-STOP
-- ASN1STOP
```

---

SL-SRAP-Config field descriptions

--- sl-LocalIdentity

---

Indicates the local UE ID of the L2 U2N Remote UE (in case of single hop) or local UE ID of the directly or indirectly connected remote UE (in case of multi hop) used in SRAP as specified in TS 38.351 [66].

sl-MappingToAddModList

---

Indicates the list of mappings between the bearer identity of the L2 U2N Remote UE and the egress RLC channel as specified in TS 38.351 [66] to be added or modified.

sl-MappingToReleaseList

---

Indicates the list of mappings between the bearer identity of the L2 U2N Remote UE and the egress RLC channel as specified in TS 38.351 [66] to be released.

sl-RemoteUE-RB-Identity

---

Identity of the end-to-end Uu bearer identity of the L2 U2N Remote UE. The value 3 for the field srb-identity-r17 (i.e., for configuring SRB3) is not supported in this version of the specification.

sl-EgressRLC-ChannelUu

---

Indicates the egress RLC channel on Uu Hop for uplink transmissions at the L2 U2N Relay UE or L2 Last U2N Relay UE.

sl-EgressRLC-Channel-UL

---

Indicates the egress RLC channel on PC5 Hop for uplink transmissions at the L2 Intermediate U2N Relay UE.

sl-EgressRLC-ChannelPC5

---

Indicates the egress RLC channel on PC5 Hop for downlink transmissions at the L2 U2N Relay UE or L2 Last U2N Relay UE and for uplink transmissions at the L2 U2N Remote UE.

---

[ . . . ]

3GPP R2-2506566 is a running change request (CR) for introduction of NR sidelink multi-hop U2N Relay in 3GPP TS 38.351. Procedures related to UE-to-Network Relay are as follows:

3.1 Terms

For the purposes of the present document, the terms given in TR 21.905 [1] and the following apply. A term defined in the present document takes precedence over the definition of the same term, if any, in TR 21.905 [1].

Child UE: A U2N Relay UE's next hop in downstream direction for serving a U2N Remote UE in U2N Relay communication. Child UE can be the U2N Remote UE or a U2N Relay UE.

Downstream: direction toward U2N Remote UE in U2N Relay communication.

Egress RLC channel: a RLC channel on which a packet is transmitted by a U2N Relay UE, a U2N Remote UE, a U2U Remote UE, a U2U Relay UE or a network node.

Egress link: a radio link on which a packet is transmitted by a U2N Relay UE, a U2N Remote UE, a U2U Remote UE, a U2U Relay UE or a network node.

Ingress RLC channel: a RLC channel on which a packet is received from a U2N Relay UE, a U2N Remote UE, a U2U Remote UE, a U2U Relay UE or a network node.

Ingress link: a radio link on which a packet is received from a U2N Relay UE, a U2N Remote UE, a U2U Remote UE, a U2U Relay UE or a network node.

Intermediate U2N Relay UE: a U2N Relay UE having both PC5 connection to a parent UE and PC5 connection to a child UE or a U2N Remote UE for serving the U2N Remote UE in case of multi-hop L2 U2N Relay communication.

Last U2N Relay UE: a U2N Relay UE having both Uu connection to the network and PC5 connection to a child UE for serving a U2N Remote UE in case of L2 U2N Relay communication.

Parent UE: A U2N Remote UE or U2N Relay UE's next hop U2N Relay UE in upstream direction for serving the U2N Remote UE in U2N Relay communication.

U2N Relay UE: a UE that provides functionality to support connectivity to the network for U2N Remote UE(s). Up to three L2 U2N Relay UEs (i.e., one Last U2N Relay and up to two Intermediate U2N Relays including one First U2N Relay) can be configured for serving a L2 U2N Remote UE in multi-hop L2 U2N Relay communication in this release.

U2N Remote UE: a UE that communicates with the network via one or more U2N Relay UEs on an indirect path.

UE-to-Network Relay communication: A mode of communication in which a UE communicates with the network through an indirect path involving only one U2N Relay UE for single-hop L2 U2N Relay communication or multiple L2 U2N Relay UEs for multi-hop L2 U2N Relay communication.

U2U Relay UE: a UE that provides functionality to support connectivity between two U2U Remote UEs.

U2U Remote UE: a UE that communicates with other UE(s) via a U2U Relay UE. Upstream: direction toward gNB in U2N Relay communication.

[ . . . ]

4.2.2 SRAP entities

FIG. 4.2.2-1 represents one possible structure for the SRAP sublayer. The figure is based on the radio interface protocol architecture defined in TS 38.300 [2].

Figure 13:
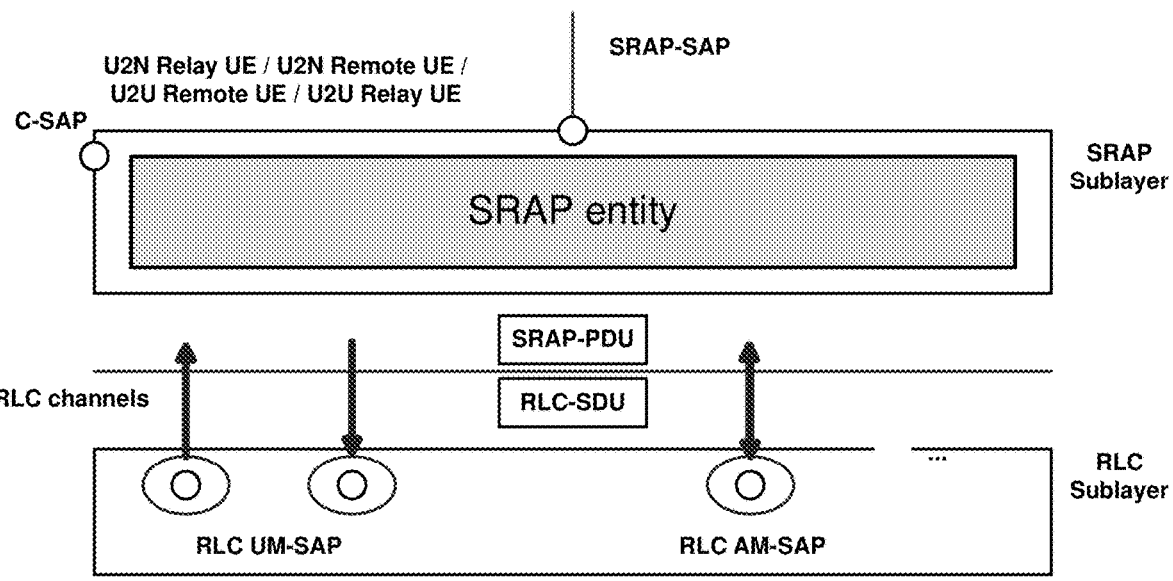
FIG. 13 is a reproduction of FIG. 4.2.2-1 of 3GPP R2-2506566.

[FIG. 4.2.2-1 of 3GPP R2-2506566, is entitled "SRAP structure overview", is reproduced as FIG. 13]

On the U2N Relay UE in single-hop U2N Relay and the last Relay UE in multi-hop U2N Relay, the SRAP sublayer contains one SRAP entity at Uu interface and a separate collocated SRAP entity at the PC5 interface. On the U2N Remote UE and intermediate Relay UE, the SRAP sublayer contains only one SRAP entity at the PC5 interface. On the U2U Relay UE and U2U Remote UE, the SRAP sublayer contains only one SRAP entity at the PC5 interface.

Each SRAP entity has a transmitting part and a receiving part. Across the PC5 interface in the U2N case, the transmitting part of the SRAP entity at the U2N Remote UE has a corresponding receiving part of an SRAP entity at the U2N Relay UE, and vice versa. Across the Uu interface, the transmitting part of the SRAP entity at the U2N Relay UE has a corresponding receiving part of an SRAP entity at the gNB, and vice versa.

Across the PC5 interface in the U2U case, the transmitting part of the SRAP entity at the U2U Remote UE has a corresponding receiving part of an SRAP entity at the U2U Relay UE, and vice versa.

Across the PC5 interface in the multi-hop U2N relay case, the transmitting part of the SRAP entity at each UE has a corresponding receiving part of an SRAP entity at the Parent UE, and vice versa.

FIG. 4.2.2-2 and FIG. 4.2.2-3 represents the functional view of the SRAP entity in U2N Relay case for the SRAP sublayer at PC5 interface and at Uu interface respectively. FIG. 4.2.2-4 represents the functional view of the SRAP entity in U2U Relay case for the SRAP sublayer at PC5 interface.

[ . . . ]

In the example of FIG. 4.2.2-2 and FIG. 4.2.2-3, at relay UE:

For data packet not corresponding to SRB0 of the Child UE, the receiving part on the SRAP entity of Uu or PC5 interface delivers SRAP Data PDUs to the transmitting part on the collocated SRAP entity of PC5 interface for DL data packets, and the receiving part on the SRAP entity of PC5 interface delivers SRAP Data PDUs to the transmitting part on the collocated SRAP entity of Uu or PC5 interface for UL data packets. As an alternative, the receiving part may deliver SRAP SDUs to the transmitting part on the collocated SRAP entity. When passing SRAP SDUs, the receiving part removes the SRAP header and the transmitting part of the relay UE adds the SRAP header with the same SRAP header content as carried on the SRAP Data PDU header prior to removal. Passing SRAP SDUs in this manner is therefore functionally equivalent to passing SRAP Data PDUs, in implementation. The following specification therefore refers to the passing of SRAP data packets.

For UL data packet corresponding to SRB0 of the Child UE, the receiving part on the SRAP entity of PC5 interface delivers SRAP SDUs to the transmitting part on the collocated SRAP entity of Uu or PC5 interface, and the transmitting part on the SRAP entity of Uu or PC5 interface adds the SRAP header in accordance with clause 5.3.3.

For DL data packet corresponding to SRB0 of the Child UE, the receiving part on the SRAP entity of Uu or PC5 interface delivers SRAP Data PDUs to the transmitting part on the collocated SRAP entity of PC5 interface, and the transmitting part on the SRAP entity of PC5 interface removes the SRAP header in accordance with clause 5.2.2. As an alternative for handling DL data packet corresponding to SRB0 not shown in FIG. 4.2.2-2 or FIG. 4.2.2-3, the receiving part on the SRAP entity of Uu or PC5 interface removes the SRAP header and delivers SRAP SDUs to the transmitting part on the collocated SRAP entity of PC5 interface.

[ . . . ]

5.2 DL Data Transfer 5.2.1 Receiving Operation of U2N Relay UE

Upon receiving an SRAP Data PDU from lower layer, the receiving part of the SRAP entity on the Uu interface of U2N Relay UE shall:

Deliver the SRAP data packet to the transmitting part of the collocated SRAP entity on the PC5 interface.

5.2.1a Receiving Operation of Intermediate U2N Relay UE

Upon receiving an SRAP Data PDU from lower layer, the receiving part of the SRAP entity on the PC5 interface of U2N Relay UE shall:

If the UE ID field in the SRAP Data PDU matches sl-LocalIdentity configured in sl-L2RemoteUE-Config:
  Perform receiving operation of U2N Remote UE in accordance with clause 5.2.3;
Else
  Deliver the SRAP data packet to the transmitting part of the collocated SRAP entity on the PC5 interface and perform transmitting operation of U2N Relay UE in accordance with clause 5.2.2.

5.2.2 Transmitting Operation of U2N Relay UE 5.2.2.0 General

The transmitting part of the SRAP entity on the PC5 interface of U2N Relay UE receives SRAP data packets from the receiving part of the SRAP entity on the Uu or PC5 interface of the same U2N Relay UE, and construct SRAP Data PDUs as needed (see clause 4.2.2).

When the transmitting part of the SRAP entity on the PC5 interface has an SRAP Data PDU to transmit, the transmitting part of the SRAP entity on the PC5 interface shall:

Determine the egress link in accordance with clause 5.2.2.1;

Determine the egress RLC channel in accordance with clause 5.2.2.2;

If the SRAP Data PDU is for SRB0 of the Child UE (for single-hop U2N Relay case, the BEARER ID field is 0, and the bearer is identified as SRB based on sl-RemoteUE-RB-Identity associated with the entry containing the sl-EgressRLC-ChannelUu which matches the LCID of the Uu Relay RLC Channel from which the SRAP Data PDU is received; or for multiple-hop U2N Relay, the UE ID filed matches the sl-LocalIdentity configured in sl-SRAP-ConfigRelay, BEARER ID field is 0, and the bearer is identified as SRB based on sl-RemoteUE-RB-Identity associated with the entry containing the sl-EgressRLC-Channel-UL which matches the LCID of the PC5 Relay RLC Channel from which the SRAP Data PDU is received):

Remove the SRAP header from the SRAP Data PDU;

Submit this SRAP Data PDU to the determined egress RLC channel of the determined egress link.

5.2.2.1 Egress Link Determination

For a SRAP Data PDU to be transmitted, SRAP entity shall:

If there is an entry in sl-RemoteUE-ToAddModList, whose sl-LocalIdentity included in sl-SRAP-ConfigRelay or sl-SRAP-ConfigRelay-ToAddModList matches the UE ID field in SRAP Data PDU:

Determine the egress link on PC5 interface corresponding to sl-L2IdentityRemote configured for the concerned sl-LocalIdentity as specified in TS 38.331 [3].

5.2.2.2 Egress RLC Channel Determination

For a SRAP Data PDU to be transmitted, the SRAP entity shall:

If the SRAP Data PDU is for SRB0 of the Child UE (for single-hop U2N Relay case, the BEARER ID field is 0 and the bearer is identified as SRB based on sl-RemoteUE-RB-Identity associated with the entry containing the sl-EgressRLC-ChannelUu which matches the LCID of the Uu Relay RLC Channel from which the SRAP Data PDU is received; or for multi-hop U2N Relay case, the UE ID field matches the sl-LocalIdentity configured in sl-SRAP-ConfigRelay, BEARER ID field is 0, and the bearer is identified as SRB based on sl-RemoteUE-RB-Identity associated with the entry containing the sl-EgressRLC-Channel-UL which matches the LCID of the PC5 Relay RLC Channel from which the SRAP Data PDU is received):

Determine the egress PC5 Relay RLC channel in the determined egress link corresponding to logical-ChannelIdentity for SL-RLC0 as specified in TS 38.331 [3].

Else if there is an entry in sl-RemoteUE-ToAddModList, whose sl-LocalIdentity included in sl-SRAP-ConfigRelay or sl-SRAP-ConfigRelay-ToAddModList matches the UE ID field in SRAP Data PDU, which includes an sl-RemoteUE-RB-Identity that matches the SRB identity or DRB identity of the SRAP Data PDU determined by the BEARER ID field (For the BEARER ID shared by both SRB and DRB, SRB and DRB are differentiated based on sl-RemoteUE-RB-Identity associated with the entry containing the sl-EgressRLC-ChannelUu which matches the LCID of the Uu Relay RLC Channel or sl-EgressRLC-Channel-UL which matches the LCID of the PC5 Relay RLC Channel from which the SRAP Data PDU is received, and for DRB, the DRB identity is BEARER ID plus 1):

If the SRAP Data PDU is for SRB1 but the corresponding sl-EgressRLC-ChannelPC5 is absent in sl-SRAP-ConfigRelay or sl-EgressRLC-Channel-DL in sl-SRAP-ConfigRelay-ToAddModList is absent:

Determine the egress PC5 Relay RLC channel in the determined egress link corresponding to logical-ChannelIdentity for SL-RLC1 as specified in TS 38.331 [3].

Else:

Determine the egress PC5 Relay RLC channel in the determined egress link corresponding to sl-EgressRLC-ChannelPC5 or sl-EgressRLC-Channel-DL configured for the concerned sl-LocalIdentity and concerned sl-RemoteUE-RB-Identity as specified in TS 38.331 [3].

5.2.3 Receiving Operation of U2N Remote UE

Upon receiving an SRAP Data PDU from lower layer, the receiving part of the SRAP entity shall:

If the SRAP Data PDU is not for SRB0 (not received from SL-RLC0 as specified in TS 38.331 [3]):

If the SRAP Data PDU is received from SL-RLC1 as specified in TS 38.331 [3]:

Remove the SRAP header of this SRAP Data PDU and deliver the SRAP SDU to PDCP entity of SRB1 by ignoring the UE ID field and BEARER ID field of this SRAP Data PDU;

Else:

Remove the SRAP header of this SRAP Data PDU and deliver the SRAP SDU to upper layer entity corresponding to the BEARER ID field of this SRAP Data PDU (For the BEARER ID shared by both SRB and DRB, SRB and DRB are differentiated based on sl-RemoteUE-RB-Identity associated with the entry containing the sl-EgressRLC-ChannelPC5 or sl-EgressRLC-Channel-UL which matches LCID of the PC5 Relay RLC Channel from which the SRAP Data PDU is received, and for DRB, the DRB identity is BEARER ID plus 1);

Else:

Deliver the SRAP SDU (i.e., same as SRAP PDU for SRB0) to upper layer, i.e., RRC layer entity (TS 38.331 [3]).

[ . . . ]

5.4 Handling of Unknown, Unforeseen, and Erroneous Protocol Data

For U2N Remote UE (includes Intermediate U2N Relay UE acting as U2N Remote UE), if sl-LocalIdentity and sl-RemoteUE-RB-Identity are both configured, when a SRAP Data PDU with SRAP header that contains a UE ID field or BEARER ID field which does not match sl-LocalIdentity or sl-RemoteUE-RB-Identity included in sl-SRAP-ConfigRemote is received, the SRAP entity shall:

Discard the received SRAP Data PDU.

For U2N Relay UE, when a SRAP Data PDU with SRAP header that contains a UE ID field or BEARER ID field which does not match sl-LocalIdentity or sl-RemoteUE-RB-Identity included in sl-SRAP-ConfigRelay or sl-SRAP-ConfigRelay-ToAddModList is received except in the case where the SRAP Data PDU from SL-RLC1 as specified in TS 38.331 [3] is the first SRAP Data PDU received from a U2N Remote UE, or when a SRAP Data PDU that contains a UE ID which does not match the concerned sl-LocalIdentity included in sl-SRAP-ConfigRelay or sl-SRAP-ConfigRelay-ToAddModList associated with sl-L2IdentityRemote of the ingress link is received by U2N Relay UE, the SRAP entity shall:

Discard the received SRAP Data PDU.

[ . . . ]

6 Protocol Data Units, Formats, and Parameters

6.1 Protocol Data Units

6.1.1 Data PDU

The SRAP Data PDU is used to convey the following with or without the PDU header:

Upper layer data.

6.2 Formats

6.2.1 General

An SRAP Data PDU is a bit string that is byte aligned (i.e. multiple of 8 bits) in length. The formats of SRAP Data PDUs are described in clause 6.2.2 and their parameters are described in clause 6.3.

6.2.2 Data PDU

FIG. 6.2.2-1 shows the format of the U2N SRAP Data PDU with SRAP header being configured. This SRAP Data PDU format is applicable to U2N SRAP SDU except those for SRB0 delivered over PC5 interface via SL-RLC0.

Figure 14:
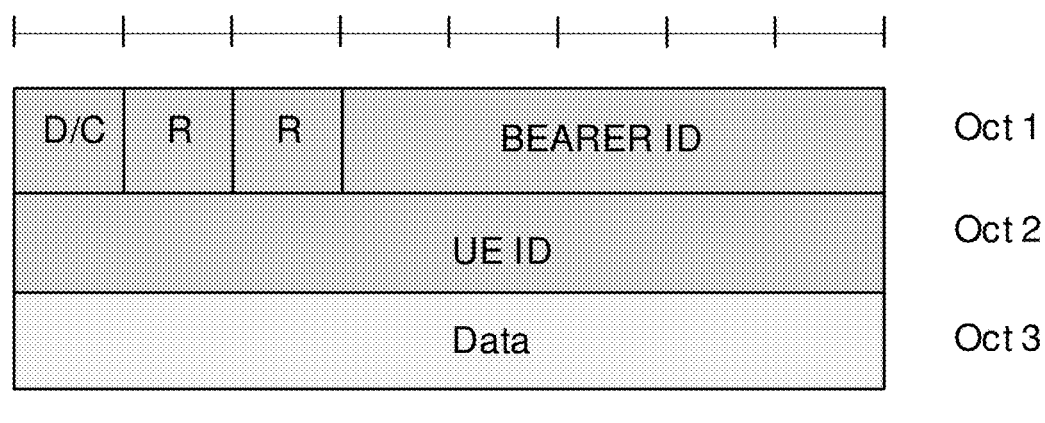
FIG. 14 is a reproduction of FIG. 4.2.2-1 of 3GPP R2-2506566.

[FIG. 6.2.2-1 of 3GPP R2-2506566, is entitled "U2N SRAP Data PDU format with SRAP header", is reproduced as FIG. 14]

FIG. 6.2.2-2 shows the format of the U2N SRAP Data PDU consisting only of a data field without any SRAP header. This SRAP Data PDU format is applicable to U2N SRAP SDU for SRB0 delivered over PC5 interface via SL-RLC0.

[FIG. 6.2.2-2 of 3GPP R2-2506566, is entitled "U2N SRAP Data PDU format without SRAP header", is reproduced as FIG. 15]

[ . . . ]

6.3 Parameters

6.3.1 General

If not otherwise mentioned in the definition of each field the bits in the parameters shall be interpreted as follows: the left most bit is the first and most significant and the right most bit is the last and least significant bit.

Unless otherwise mentioned, integers are encoded in standard binary encoding for unsigned integers. In all cases the bits appear ordered from MSB to LSB when read in the PDU.

6.3.2 UE ID

Length: 8 bits.

In U2N Relay case, this field carries local identity of U2N Remote UE. In U2U Relay case, there are two UE ID fields: the first one carrying the local identity of SRC U2U Remote UE, the second one carrying the local identity of DST U2U Remote UE.

6.3.3 BEARER ID

Length: 5 bits.

In U2N Relay case, this field carries information to identify Uu radio bearer for U2N Remote UE. For SRBs, the value is set to SRB Identity (which is configured by RRC parameter srb-Identity). For DRBs, the value is set to DRB Identity (which is configured by RRC parameter drb-Identity) minus 1.

In U2U Relay case, this field carries information to identify end-to-end PC5 radio bearer for U2U Remote UE. For SL-SRBs, the value is set to 0/1/2/3 for SL-SRB 0/1/2/3 respectively. For SL-DRBs, the value is set to the 5 LSBs of slrb-PC5-ConfigIndex used in end-to-end SL DRB configuration procedure as specified in TS 38.331 [3].

6.3.4 Data

Length: Variable

This field carries the SRAP SDU (i.e. PDCP PDU or RRC PDU).

6.3.5 R

Length: 1 bit

Reserved. In this release, reserved bits shall be set to 0. Reserved bits shall be ignored by the receiver.

6.3.6 D/C

Length: 1 bit

This field indicates whether the corresponding SRAP PDU is an SRAP Data PDU or an SRAP Control PDU (not used in this release).

[Table 6.3.6-1 of 3GPP R2-2506566, is entitled "D/C field", is reproduced as FIG. 16]

3GPP TS 38.331 specifies the configuration of PC5 Relay RLC channel named as SL-RLC0 used for Remote UE's SRB0 message transmission/reception in NR sidelink L2 U2N Relay operation as follows:

9.1.1.4 SCCH Configuration

[ . . . ]

Parameters that are specified for NR sidelink L2 U2N Relay operations, which is used for the PC5 Relay RLC channel for Remote UE's SRB0 message transmission/reception. The PC5 Relay RLC channel using this configuration is named as SL-RLC0.

| Name | Value | Semantics description | Ver |
|---|---|---|---|
| RLC configuration | | AM | |
| >sn-FieldLength | 12 | | |
| >t-Reassembly | Un-defined | Selected by the receving UE, up to UE implementation | |
| >t-PollRetransmit | Un-defined | Selected by the transmitting UE, up to UE implementation | |
| >pollPDU | Un-defined | Selected by the transmitting UE, up to UE implementation | |
| >pollByte | Un-defined | Selected by the transmitting UE, up to UE implementation | |
| >maxRetxThreshold | Un-defined | Selected by the transmitting UE, up to UE implementation | |
| >t-StatusProhibit | Un-defined | Selected by the receiving UE, up to UE implementation | |
| >logicalChannelIdentity | 56 | | |
| MAC configuration | | | |
| >priority | 1 | | |
| >prioritisedBitRate | Infinity | | |
| >logicalChannelGroup | 0 | | |
| >schedulingRequestId | 0 | The scheduling request configuration with this value is applicable for this SCCH if configured by the network. The scheduling request configuration is not applicable to L2 Remote UE. | |
| >sl-HARQ-FeedbackEnabled | Un-defined | Selected by the transmitting UE, up to UE implementation | |

[ . . . ]

Single-hop UE-to-Network (U2N) Relay was specified in Release 18. For single-hop U2N Relay, a U2N Relay UE may be used to support data communication between a remote UE and the network in case the remote UE cannot communicate with the network directly. A U2N Relay UE needs to establish one PC5 unicast link (or a PC5 connection) with the remote UE and establish a RRC connection with a network node (e.g. a gNB) to support data communication between the remote UE and the network via the U2N Relay UE.

Figure 17:
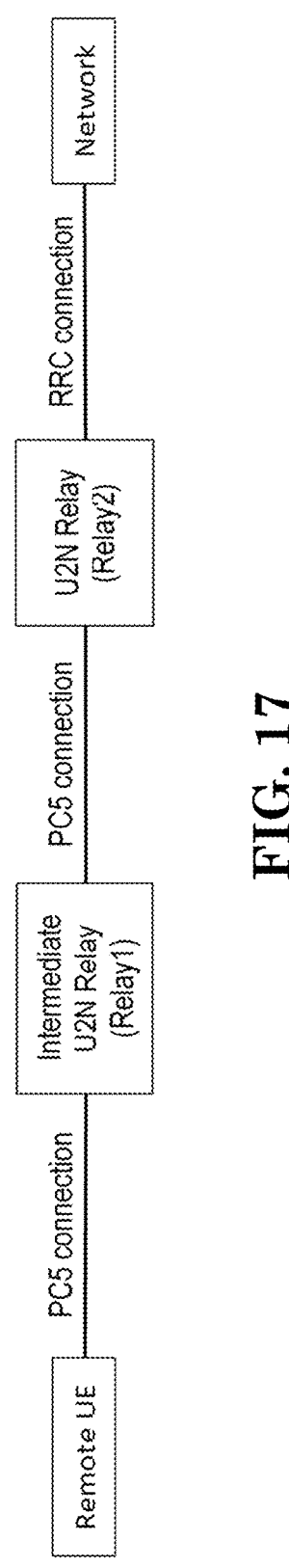
FIG. 17 illustrates an exemplary 2-hop U2N Relay according to one exemplary embodiment.
Figure 18:
FIG. 18 illustrates an exemplary 3-hop U2N Relay according to one exemplary embodiment.

Multi-hop U2N Relay is supported in Release 19 and at most 2 additional U2N Relay UEs may be added for multi-hop U2N Relay. FIG. 17 illustrates an example architecture of 2-hop UE-to-Network Relay, where a L2 Remote UE connects with the gNB via an Intermediate U2N Relay UE and a 5G ProSe U2N Relay UE (or a L2 U2N Relay UE) and FIG. 18 illustrates an example architecture of 3-hop UE-to-Network Relay, where a L2 Remote UE connects with the gNB via a First U2N Relay UE, an Intermediate U2N Relay UE, and a Last U2N Relay UE.

FIG. 16.12.2.1-2 (reproduced as FIG. 5) and FIG. 16.12.2.1-4 (reproduced as FIG. 6) of 3GPP R2-2506568 illustrate control plane protocol stacks for single-hop L2 U2N Relay and multi-hop U2N Relay respectively. For L2 U2N Relay, the SRAP sublayer over PC5 hop is used for the purpose of bearer mapping. For L2 U2N Remote UE's message on SRB0, the SRAP header is not present over PC5 hop between the U2N Remote UE and the directly connected U2N Relay UE, but the SRAP header is present over Uu hop or PC5 hop between U2N Relay UEs for both DL and UL.

FIG. 16.12.5.1-1 (reproduced as FIG. 7) and FIG. 16.12.5.1-2 (reproduced as FIG. 8) of 3GPP R2-2506568 illustrate procedures for L2 U2N Remote UE connection establishment for single-hop L2 U2N Relay and multi-hop U2N Relay respectively. As illustrated in FIG. 16.12.5.1-1 (reproduced as FIG. 7), after the L2 U2N Remote and L2 U2N Relay UE perform discovery procedure and establish a PC5-RRC connection, the L2 U2N Remote UE sends a RRC SetupRequest message (on SRB0) to the gNB via the L2 U2N Relay UE and receives a RR (Setup message (on SRB0) from the gNB via the L2 U2N Relay UE, wherein the RRCSetupRequest message is sent to the L2 U2N Relay UE using a specified PC5 Relay RLC channel configuration (i.e. SL-RLC0) over PC5 interface and the RR (Setup message is sent to the L2 U2N Relay UE using SRB0 relaying Uu Relay RLC channel over Uu interface. The RRCSetup message may include L2 U2N relay operation related configurations used by L2 U2N Remote UE, which may include a local ID (i.e. sl-LocalIdentity) and SLRB-to-egress Relay RLC channel mappings (i.e. sl-MappingToAddModList) for the L2 U2N Remote UE.

The L2 U2N Relay UE may send the SidelinkUEInformationNR message to request for the dedicated configurations required to support the relay operation for the L2 U2N Remote UE. The gNB may then reply a RRC Reconfiguration message to include the dedicated configurations, which may include IE SL-1.2RelayUE-Config. And, the IE SL-1.2RelayUE-Config may include sl-SRAP-ConfigRelays of directly/indirectly connected Child UEs. Each sl-SRAP-ConfigRelay may include a local ID (i.e. sl-LocalIdentity) and SLRB-to-egress Relay RLC channel mappings (i.e. sl-MappingToAddModList).

Similarly, in case of 3-hop L2 U2N Relay as illustrated in FIG. 16.12.5.1-2 (reproduced as FIG. 8), the RRC SetupRequest message of the L2 U2N Remote UE should be forwarded to the gNB via the First U2N Relay UE, the Intermediate U2N Relay UE, and the L2 U2N Relay UE. And, the gNB should reply a RRC Setup message to the L2 U2N Remote UE via the L2 U2N Relay UE, the Intermediate U2N Relay UE, and the First U2N Relay UE. The RRCSetup message is delivered toward the L2 U2N Remote UE using SRB0 relaying Uu Relay RLC channel over Uu or PC5 Relay RLC channels (configured by the gNB) over PC5 through multiple U2N Relay UEs. In addition, the RR (Setup message for the L2 U2N Remote UE is delivered via a specified PC5 Relay RLC channel over PC5 from the first L2 U2N Relay UE to the L2 U2N Remote UE.

In subclause 5.2.2.0 of 3GPP R2-2506566, the U2N Relay UE examines the following statements for determination of removing the SRAP header from the SRAP Data PDU which includes the SRB0 message in downlink (DL) aiming for the U2N Remote UE:

If the SRAP Data PDU is for SRB0 of the Child UE (for single-hop U2N Relay case, the BEARER ID field is 0, and the bearer is identified as SRB based on sl-RemoteUE-RB-Identity associated with the entry containing the sl-EgressRLC-ChannelUu which matches the LCID of the Uu Relay RLC Channel from which the SRAP Data PDU is received; or for multiple-hop U2N Relay, the UE ID field matches the sl-LocalIdentity configured in sl-SRAP-ConfigRelay, BEARER ID field is 0, and the bearer is identified as SRB based on sl-Remote UE-RB-Identity associated with the entry containing the sl-EgressRLC-Channel-UL which matches the LCID of the PC5 Relay RLC Channel from which the SRAP Data PDU is received):

Remove the SRAP header from the SRAP Data PDU;

It is noted that new texts (underlined) are added on top of Rel-18 SRAP specification for supporting multi-hop U2N Relay. Two cases are specified in the above statements: one is used to describe the single-hop U2N Relay case and the other is used to describe the multi-hop U2N Relay case. For the multi-hop U2N Relay case, the statement "the PC5 Relay RLC Channel from which the SRAP Data PDU is received" implies the U2N Relay UE is an Intermediate U2N Relay UE engaging in multi-hop U2N Relay operation and the statement "the UE ID field matches the sl-LocalIdentity configured in sl-SRAP-ConfigRelay" implies the concerned U2N Remote UE is a directly connected Child UE of the Intermediate U2N Relay UE. More precisely, here the sl-LocalIdentity is configured in sl-SRAP-ConfigRelay which is included directly in the IE SL-Remote UE-ToAddMod instead of the IE SL-SRAP-ConfigRelay-ToAddMod. According to 3GPP R2-2506574, IE SL-SRAP-ConfigRelay-ToAddModList (which includes a list of SL-SRAP-ConfigRelay-ToAddMod) is a list of SRAP configuration for each indirectly connected child UE in the multi-hop case.

Figure 19:
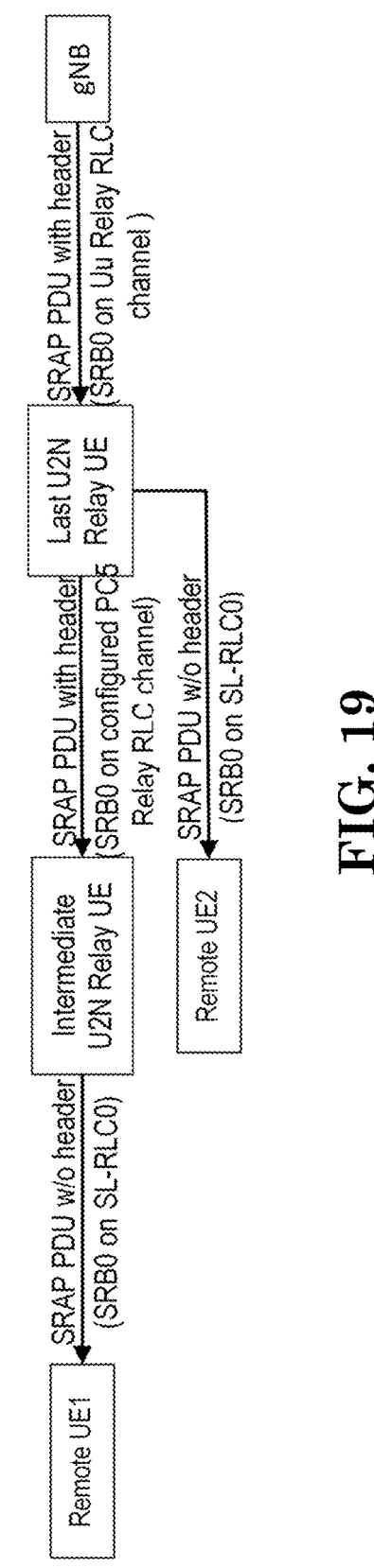
FIG. 19 illustrates an exemplary last U2N Relay to support 1-hop and 3-hop L2 U2N relays according to one exemplary embodiment.

For the single-hop U2N Relay case, the statement "the Uu Relay RLC Channel from which the SRAP Data PDU is received" implies the SRAP Data PDU which includes the SRB0 message is received from the gNB over the Uu interface. In other words, the U2N Relay UE is a Last U2N Relay UE connecting with the gNB directly. However, the SRAP Data PDU received by the Last U2N Relay UE may aim for either a directly connected Child UE or an indirectly connected Child UE of the Last U2N Relay UE as illustrated in FIG. 19. In case the SRAP Data PDU is aiming for a directly connected Child UE, the Last U2N Relay UE should remove the SRAP header from the SRAP Data PDU (because the SRAP header is not present over PC5 hop between the U2N Relay UE and the directly connected U2N Remote UE according to subclause 16.12.2.1 of 3GPP R2-2506568). Otherwise (i.e. the SRAP Data PDU is aiming for an indirectly connected Child UE), the SRAP header should be kept for transmission to the Intermediate U2N Relay UE (because the SRAP header is present over PC5 hop between U2N Relay UEs according to subclause 16.12.2.1 of 3GPP R2-2506568). To prevent the Last U2N Relay UE from removing the SRAP header of a SRAP Data PDU aiming for an indirectly connected Child UE, there is a need for the Last U2N Relay UE to exclude this case when determining to remove the SRAP header from the SRAP Data PDU.

Basically, the Last U2N Relay UE may determine the concerned U2N Remote UE is a directly connected Child UE if the UE ID field included in the SRAP header matches the sl-LocalIdentity configured in sl-SRAP-ConfigRelay. More precisely, the sl-LocalIdentity is configured in sl-SRAP-ConfigRelay which is included directly in the IE SL-Remote UE-ToAddMod instead of the IE SL-SRAP-ConfigRelay-ToAddModList or SL-SRAP-ConfigRelay-ToAddMod.

A potential text proposal for subclause 5.2.2.0 with the above solution is as follows:

If the SRAP Data PDU is for SRB0 of the Child UE (for single-hop U2N Relay case, the UE ID field matches the sl-LocalIdentity configured in sl-SRAP-ConfigRelay, the BEARER ID field is 0, and the bearer is identified as SRB based on sl-Remote UE-RB-Identity associated with the entry containing the sl-EgressRLC-ChannelUu which matches the LCID of the Uu Relay RLC Channel from which the SRAP Data PDU is received; or for multiple-hop U2N Relay, the UE ID field matches the sl-LocalIdentity configured in sl-SRAP-ConfigRelay, BEARER ID field is 0, and the bearer is identified as SRB based on sl-Remote UE-RB-Identity associated with the entry containing the sl-EgressRLC-Channel-UL which matches the LCID of the PC5 Relay RLC Channel from which the SRAP Data PDU is received):

Remove the SRAP header from the SRAP Data PDU;

A similar issue exists in subclause 5.2.2.2 of 3GPP R2-2506566 for the U2N Relay UE to determine the egress RLC channel for a received SRAP Data PDU with SRB0 message, considering that the PC5 Relay RLC channels between U2N Relay UEs are configured by the gNB via dedicated RRC message instead of using the specified PC5 RLC channel (i.e., SL-RLC0). The concept of the above solution may also be applied for the Last U2N Relay UE to exclude the case of SRAP Data PDU aiming for an indirectly connected Child UE when determining the egress RLC channel for the received SRAP Data PDU.

A potential text proposal for subclause 5.2.2.2 of 3GPP R2-2506566 with the above solution is as below:

If the SRAP Data PDU is for SRB0 of the Child UE (for single-hop U2N Relay case, the UE ID field matches the sl-LocalIdentity configured in sl-SRAP-ConfigRelay, the BEARER ID field is 0 and the bearer is identified as SRB based on sl-Remote UE-RB-Identity associated with the entry containing the sl-EgressRLC-ChannelUu which matches the LCID of the Uu Relay RLC Channel from which the SRAP Data PDU is received; or for multi-hop U2N Relay case, the UE ID field matches the sl-LocalIdentity configured in sl-SRAP-ConfigRelay, BEARER ID field is 0, and the bearer is identified as SRB based on sl-Remote UE-RB-Identity associated with the entry containing the sl-EgressRLC-Channel-UL which matches the LCID of the PC5 Relay RLC Channel from which the SRAP Data PDU is received):

Determine the egress PC5 Relay RLC channel in the determined egress link corresponding to logical-ChannelIdentity for SL-RLC0 as specified in TS 38.331 (as discussed in 3GPP R2-2506566).

Else if there is an entry in sl-Remote UE-ToAddModList, whose sl-LocalIdentity included in sl-SRAP-ConfigRelay or sl-SRAP-ConfigRelay-ToAddModList matches the UE ID field in SRAP Data PDU, which includes an sl-RemoteUE-RB-Identity that matches the SRB identity or DRB identity of the SRAP Data PDU determined by the BEARER ID field (For the BEARER ID shared by both SRB and DRB, SRB and DRB are differentiated based on sl-Remote UE-RB-Identity associated with the entry containing the sl-EgressRLC-ChannelUu which matches the LCID of the Uu Relay RLC Channel or sl-EgressRLC-Channel-UL which matches the LCID of the PC5 Relay RLC Channel from which the SRAP Data PDU is received, and for DRB, the DRB identity is BEARER ID plus 1):

If the SRAP Data PDU is for SRB1 but the corresponding sl-EgressRLC-ChannelPC5 is absent in sl-SRAP-ConfigRelay or sl-EgressRLC-Channel-DL in sl-SRAP-ConfigRelay-ToAddModList is absent:

Determine the egress PC5 Relay RLC channel in the determined egress link corresponding to logical-ChannelIdentity for SL-RLC1 as specified in TS 38.331 (as discussed in 3GPP R2-2506566).

Else:

Determine the egress PC5 Relay RLC channel in the determined egress link corresponding to sl-EgressRLC-ChannelPC5 or sl-EgressRLC-Channel-DL configured for the concerned sl-LocalIdentity and concerned sl-Remote UE-RB-Identity as specified in TS 38.331 (as discussed in 3GPP R20=2506566).

FIG. 20 is a flow chart 2000 for a UE-to-Network (U2N) Relay User Equipment (UE). In step 2005, the U2N Relay UE establishes at least one PC5 connection (or PC5 unicast link) with at least one child UE and establishes a Radio Resource Control (RRC) connection with a network node. In step 2010, the U2N Relay UE receives a Sidelink Relay Adaptation Protocol (SRAP) Data Protocol Data Unit (PDU) on a Uu Relay Radio Link Control (RLC) Channel from the network node, wherein the SRAP Data PDU includes a header and a data field and wherein the header includes a BEARER identity (ID) field and a UE ID field. In step 2015, the U2N Relay UE determines to remove the header from the SRAP data PDU if the UE ID field matches a sl-LocalIdentity configured in a sl-SRAP-ConfigRelay, the BEARER ID field is 0, and a bearer indicated by the BEARER ID field is identified as Signalling Radio Bearer (SRB) based on a sl-Remote UE-RB-Identity associated with an entry containing the sl-EgressRLC-ChannelUu which matches a Logical Channel ID (LCID) of a Uu Relay RLC Channel from which the SRAP Data PDU is received.

In one embodiment, the sl-SRAP-ConfigRelay may be included directly in a SL-Remote UE-ToAddMod. The SL-Remote UE-ToAddMod may also include a sl-L2IdentityRemote of a directly connected child UE.

In one embodiment, the sl-SRAP-ConfigRelay may not be included in a SL-SRAP-ConfigRelay-ToAddMod or SL-SRAP-ConfigRelay-ToAddModList. The SL-SRAP-ConfigRelay-ToAddMod may be included in the SL-SRAP-ConfigRelay-ToAddModList. The SL-SRAP-ConfigRelay-ToAddModList may include a list of SRAP configuration(s) for each indirectly connected child UE in multi-hop U2N Relay.

In one embodiment, the sl-SRAP-ConfigRelay may be included in a RRCReconfiguration message received from the network node. The U2N Relay UE may be a Last U2N Relay UE. The data field may include a RRCSetup message.

In one embodiment, the U2N Relay UE could submit the SRAP data PDU to a determined egress RLC channel of a determined egress link.

Referring back to FIGS. 3 and 4, in one exemplary embodiment from the perspective of a U2N Relay UE. The U2N Relay UE 300 includes a program code 312 stored in the memory 310. The CPU 308 could execute program code 312 to enable the U2N Relay UE (i) to establish at least one PC5 connection (or PC5 unicast link) with at least one child UE and establishes a RRC connection with a network node, (ii) to receive a SRAP Data PDU on a Uu Relay RLC Channel from the network node, wherein the SRAP Data PDU includes a header and a data field and wherein the header includes a BEARER ID field and a UE ID field, and (iii) to determine to remove the header from the SRAP data PDU if the UE ID field matches a sl-LocalIdentity configured in a sl-SRAP-ConfigRelay, the BEARER ID field is 0, and a bearer indicated by the BEARER ID field is identified as SRB based on a sl-Remote UE-RB-Identity associated with an entry containing the sl-EgressRLC-ChannelUu which matches a LCID of a Uu Relay RLC Channel from which the SRAP Data PDU is received. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a UE-to-Network (U2N) Relay User Equipment (UE), comprising:

the U2N Relay UE establishes at least one PC5 connection (or PC5 unicast link) with at least one child UE and establishes a Radio Resource Control (RRC) connection with a network node;

the U2N Relay UE receives a Sidelink Relay Adaptation Protocol (SRAP) Data Protocol Data Unit (PDU) on a Uu Relay Radio Link Control (RLC) Channel from the network node, wherein the SRAP Data PDU includes a header and a data field and wherein the header includes a BEARER identity (ID) field and a UE ID field; and the U2N Relay UE determines to remove the header from the SRAP data PDU if the UE ID field matches a sl-LocalIdentity configured in a sl-SRAP-ConfigRelay, the BEARER ID field is 0, and a bearer indicated by the BEARER ID field is identified as Signalling Radio Bearer (SRB) based on a sl-Remote UE-RB-Identity associated with an entry containing the sl-EgressRLC-ChannelUu which matches a Logical Channel ID (LCID) of a Uu Relay RLC Channel from which the SRAP Data PDU is received.

2. The method of claim 1, wherein the sl-SRAP-ConfigRelay is included directly in a SL-Remote UE-ToAddMod.

3. The method of claim 2, wherein the SL-Remote UE-ToAddMod also includes a sl-L2IdentityRemote of a directly connected child UE.

4. The method of claim 1, wherein the sl-SRAP-ConfigRelay is not included in a SL-SRAP-ConfigRelay-ToAddMod or SL-SRAP-ConfigRelay-ToAddModList.

5. The method of claim 4, wherein the SL-SRAP-ConfigRelay-ToAddMod is included in the SL-SRAP-ConfigRelay-ToAddModList.

6. The method of claim 5, wherein the SL-SRAP-ConfigRelay-ToAddModList includes a list of SRAP configuration(s) for each indirectly connected child UE in multi-hop U2N Relay.

7. The method of claim 1, wherein the sl-SRAP-ConfigRelay is included in a RRCReconfiguration message received from the network node.

8. The method of claim 1, wherein the U2N Relay UE is a Last U2N Relay UE.

9. The method of claim 1, wherein the data field includes a RRCSetup message.

10. The method of claim 1, further comprising:

the U2N Relay UE submits the SRAP data PDU to a determined egress RLC channel of a determined egress link.

11. A UE-to-Network (U2N) Relay User Equipment (UE), comprising:

a control circuit;

a processor installed in the control circuit;

a memory installed in the control circuit and coupled to the processor;

wherein the processor is configured to execute a program code stored in the memory to:

establish at least one PC5 connection (or PC5 unicast link) with at least one child UE and establishes a Radio Resource Control (RRC) connection with a network node;

receive a Sidelink Relay Adaptation Protocol (SRAP) Data Protocol Data Unit (PDU) on a Uu Relay Radio Link Control (RLC) Channel from the network node, wherein the SRAP Data PDU includes a header and a data field and wherein the header includes a BEARER identity (ID) field and a UE ID field; and determine to remove the header from the SRAP data PDU if the UE ID field matches a sl-LocalIdentity configured in a sl-SRAP-ConfigRelay, the BEARER ID field is 0, and a bearer indicated by the BEARER ID field is identified as Signalling Radio Bearer (SRB) based on a sl-Remote UE-RB-Identity associated with an entry containing the sl-EgressRLC-ChannelUu which matches a Logical Channel ID (LCID) of a Uu Relay RLC Channel from which the SRAP Data PDU is received.

12. The U2N Relay UE of claim 11, wherein the sl-SRAP-ConfigRelay is included directly in a SL-Remote UE-ToAddMod.

13. The U2N Relay UE of claim 12, wherein the SL-Remote UE-ToAddMod also includes a sl-L2IdentityRemote of a directly connected child UE.

14. The U2N Relay UE of claim 11, wherein the sl-SRAP-ConfigRelay is not included in a SL-SRAP-ConfigRelay-ToAddMod or SL-SRAP-ConfigRelay-ToAddModList.

15. The U2N Relay UE of claim 14, wherein the SL-SRAP-ConfigRelay-ToAddMod is included in the SL-SRAP-ConfigRelay-ToAddModList.

16. The U2N Relay UE of claim 15, wherein the SL-SRAP-ConfigRelay-ToAddModList includes a list of SRAP configuration(s) for each indirectly connected child UE in multi-hop U2N Relay.

17. The U2N Relay UE of claim 11, wherein the sl-SRAP-ConfigRelay is included in a RRCReconfiguration message received from the network node.

18. The U2N Relay UE of claim 11, wherein the U2N Relay UE is a Last U2N Relay UE.

19. The U2N Relay UE of claim 11, wherein the data field includes a RRCSetup message.

20. The U2N Relay UE of claim 11, further comprising:

the U2N Relay UE submits the SRAP data PDU to a determined egress RLC channel of a determined egress link.

* * * * *